US012595334B2

(12) United States Patent
Tohjima et al.

(10) Patent No.: US 12,595,334 B2
(45) Date of Patent: Apr. 7, 2026

(54) COMPOUND, MIXTURE, CURABLE RESIN COMPOSITION AND CURED PRODUCT THEREOF, AND METHOD FOR PRODUCING COMPOUND

(71) Applicant: NIPPON KAYAKU KABUSHIKI KAISHA, Tokyo (JP)

(72) Inventors: Takayuki Tohjima, Tokyo (JP); Masanori Hashimoto, Tokyo (JP); Masato Yarita, Tokyo (JP); Masataka Nakanishi, Tokyo (JP); Atsuhiko Hasegawa, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 991 days.

(21) Appl. No.: 17/777,705

(22) PCT Filed: Nov. 16, 2020

(86) PCT No.: PCT/JP2020/042623
§ 371 (c)(1),
(2) Date: May 18, 2022

(87) PCT Pub. No.: WO2021/100658
PCT Pub. Date: May 27, 2021

(65) Prior Publication Data
US 2023/0002547 A1 Jan. 5, 2023

(30) Foreign Application Priority Data

| | | |
|---|---|---|
| Nov. 19, 2019 | (JP) | 2019-208543 |
| Jan. 22, 2020 | (JP) | 2020-008403 |
| May 8, 2020 | (JP) | 2020-082307 |

(51) Int. Cl.
*C08G 61/10* (2006.01)
*C07B 61/00* (2006.01)
(Continued)

(52) U.S. Cl.
CPC ..... *C08G 61/10* (2013.01); *C08G 2261/1332* (2013.01); *C08G 2261/146* (2013.01); *C08G 2261/312* (2013.01)

(58) Field of Classification Search
None
See application file for complete search history.

(56) References Cited

U.S. PATENT DOCUMENTS

2002/0161091 A1* 10/2002 Amou .................... C08F 12/34
524/425

FOREIGN PATENT DOCUMENTS

JP 2004271692 A * 9/2004
JP 2005154379 A * 6/2005
(Continued)

OTHER PUBLICATIONS

Walczak, M. et al., "Unusual cis and trans architecture of dihydrofunctional double-decker shaped silsesquioxane and synthesis of its ethyl bridged π-conjugated arene derivatives", New Journal of Chemistry, 2017, pp. 3290-3296.
(Continued)

*Primary Examiner* — Ha S Nguyen
(74) *Attorney, Agent, or Firm* — GREENBLUM & BERNSTEIN, P.L.C.

(57) ABSTRACT

A compound of formula 1:

(1)

(Continued)

-continued

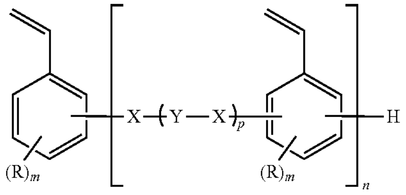

where X and Y are each a different optional organic group. When there is a plurality of X, each X in the plurality of X may be the same as or different from each other. When there is a plurality of Y, each Y in the plurality of Y may be the same as or different from each other. R represents a hydrocarbon group having 1 to 10 carbon atoms or a halogenated alkyl group. When there is a plurality of R, each R in the plurality of R may be the same as or different from each other. Variable m is an integer of 0 to 3, n is a repeating unit and satisfies $1 \leq n \leq 20$, and p is a repeating unit and satisfies $0 \leq p \leq 20$.

10 Claims, 20 Drawing Sheets

(51) Int. Cl.

| | |
|---|---|
| ***C07C 1/30*** | (2006.01) |
| ***C07C 15/16*** | (2006.01) |
| ***C07C 15/50*** | (2006.01) |
| ***C07C 22/04*** | (2006.01) |
| ***C08F 12/34*** | (2006.01) |
| ***C08F 283/08*** | (2006.01) |
| ***C08F 299/02*** | (2006.01) |
| ***C08G 61/02*** | (2006.01) |
| ***C08K 5/01*** | (2006.01) |
| ***C08L 65/00*** | (2006.01) |
| ***C08L 71/12*** | (2006.01) |

(56) References Cited

FOREIGN PATENT DOCUMENTS

| | | | | | |
|---|---|---|---|---|---|
| JP | 2005-179276 A | | 7/2005 | | |
| JP | 2008-31223 A | | 2/2008 | | |
| JP | 2008031223 A | * | 2/2008 | | |
| KR | 10-2017-0007642 A | | 1/2017 | | |
| KR | 20170007642 A | * | 1/2017 | ............. | C07C 15/12 |

OTHER PUBLICATIONS

Croix, C. et al., “Synthesis of Ketones from Acyl Chlorides and Triorganoindium Reagents by Pd-Catalyzed Cross-Coupling”, Synthetic Communications, 2006, pp. 3261-3270.

Carpino, L. et al., “Polystyrene-Based Deblocking-Scavenging Agents for the 9-Fluorenylmethloxycarbonyl Amino-Protecting Group”, Journal of Organic Chemistry, 1983, pp. 661-665.

Notice of Reasons for Refusal (Office Action) in in Japanese Counterpart Patent Appl. No. 2021-512825, dated May 24, 2021, along with an English translation thereof.

International Search Report issued in International Patent Application No. PCT/JP2020/042623, dated Jan. 19, 2021, along with an English translation thereof.

* cited by examiner

COMPOUND, MIXTURE, CURABLE RESIN COMPOSITION AND CURED PRODUCT THEREOF, AND METHOD FOR PRODUCING COMPOUND

TECHNICAL FIELD

The present invention relates to a compound, a mixture, a curable resin composition, a cured product thereof, and a method for producing the compound. The present invention is suitably used for electrical and electronic components such as a semiconductor sealing material, a printed wiring substrate, and a build-up laminated board, lightweight high-strength materials such as carbon fiber reinforced plastics and glass fiber reinforced plastics, and 3D printing applications.

BACKGROUND ART

In recent years, a wider range of and higher properties have been required for a laminated board on which electric and electronic components are mounted in view of the expansion of the field of use of the laminated board. The mainstream is to mount a semiconductor chip according to the related art on a metal lead frame, but a semiconductor chip with high processing capacity such as a central processing unit (hereinafter, referred to as CPU) is increasingly mounted on a laminated board made of polymer materials.

In particular, in the case of a semiconductor package (hereinafter, referred to as PKG) used in a smartphone or the like, a reduction in thickness of a PKG substrate is required in order to meet demands for a reduction in size, a reduction in thickness, and an increase in density. However, the PKG substrate with a reduced thickness has a low rigidity, and thus, defects such as large warpage occur due to the heating at the time of solder-mounting the PKG on a motherboard (PCB). In order to reduce warpage, a PKG substrate material having a high Tg equal to or higher than the solder mounting temperature is required.

In addition, in the fifth-generation communication system "5G", which is currently being developed at an accelerated rate, it is expected that a further increase in capacity and high-speed communication will progress. The needs for a low dielectric loss tangent material are increasing more and more, and a dielectric loss tangent of 0.005 or less is required at least at 1 GHz.

Further, electronic devices have been developed in the field of automobiles, and precision electronic equipment may be disposed in the vicinity of an engine driving unit, and therefore, heat resistance and moisture resistance at a higher level are required. SiC semiconductors have begun to be used in electric trains, air conditioners, and the like, and extremely high heat resistance has been required for a sealing material of a semiconductor device, and thus, an epoxy resin sealing material according to the related art cannot be used.

In view of such a background, a polymer material capable of achieving both heat resistance and low dielectric loss tangent properties has been studied. For example, Patent Literature 1 proposes a composition containing a maleimide resin and a propenyl group-containing phenol resin. However, on the other hand, a phenolic hydroxyl group which is not involved in a reaction remains during a curing reaction, and thus, it cannot be said that the electrical properties are sufficient. Patent Literature 2 discloses an allyl ether resin in which a hydroxyl group is substituted with an allyl group. However, it is shown that Claisen rearrangement occurs at 190° C., and a phenolic hydroxyl group which does not contribute to a curing reaction is generated at 200° C. that is a molding temperature of general substrates, and thus, electrical properties are not satisfied.

In addition, in recent years, 3D printing has attracted attention as a technique of three-dimensional shaping, and this technique of 3D printing has begun to be applied in the fields such as aerospace, vehicles, and connectors of electronic components used for them, where reliability is required. In particular, photocurable and thermosetting resins have been studied in applications represented by stereo lithography (SLA) and digital light processing (DLP). Therefore, stability and accuracy of a shape are mainly required in a common method of transferring a shape from a mold, but in a 3D printing application, various properties such as heat resistance, mechanical properties, toughness, flame retardancy, and electrical properties are required, and development of materials thereof is advanced. In addition, in the case of being used for a structural member, a property change due to moisture absorption or the like is a problem. At present, an acrylate resin or an epoxy resin is applied in such applications, but a cured product either of them contains a large number of ester bonds, ether bonds, and hydroxyl groups, and thus the properties in moisture absorption are not sufficient.

CITATION LIST

Patent Literature

Patent Literature 1: JP-A-H04-359911
Patent Literature 2: WO 2016/002704

SUMMARY OF INVENTION

Technical Problem

The present invention has been made in view of such circumstances, and an object of the present invention is to provide a compound, a mixture, a curable resin composition, and a cured product thereof, which exhibit excellent heat resistance and electrical properties and have good curability, and a method for producing the compound.

Solution to Problem

That is, the present invention relates to the following items [1] to [12].

[1] A compound represented by the following formula (1).

(1)

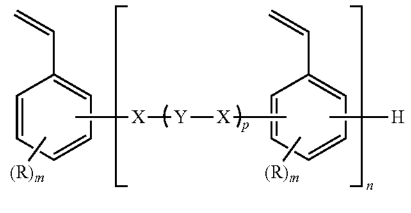

(In the formula (1), X and Y each represent a different optional organic group. When there are a plurality of X, the plurality of X may be the same as or different from each other. When there are a plurality of Y, the plurality of Y may be the same as or different from each other. R represents a hydrocarbon group having 1 to 10 carbon atoms or a halogenated alkyl group. When there are a plurality of R, the plurality of R may be the same as or different from each other. m represents an integer of 0 to 3, n represents a repeating unit and satisfies 1≤n≤20, and p represents a repeating unit and satisfies 0≤p≤20.)

[2] The compound described in the aforementioned item [1], wherein in the formula (1), n satisfies 1.1≤n≤20.

[3] The compound described in the aforementioned item [1] or [2], wherein in the formula (1), X represents one or more of (A) to (D) described in the following formula (2), and Y represents one or more of (E) to (K) described in the following formula (3).

(2)

(A)

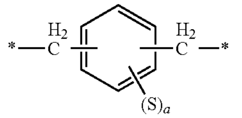

(B)

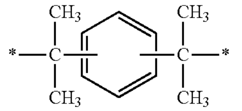

(C)

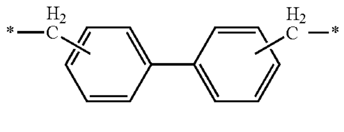

(D)

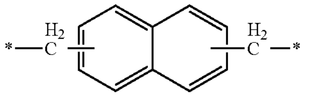

(S represents a hydrocarbon group having 1 to 3 carbon atoms, and a represents an integer of 0 to 4. When there are a plurality of S, the plurality of S may be the same as or different from each other. The symbol * indicates a bonding position.)

(3)

(E)

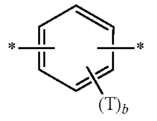

(F)

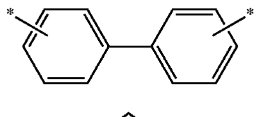

(G)

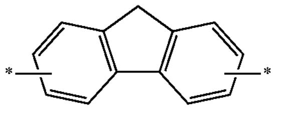

(H)

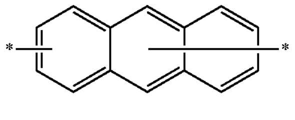

-continued (I)

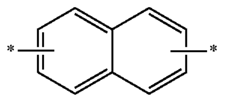

(J)

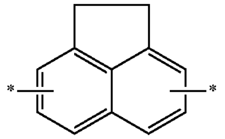

(K)

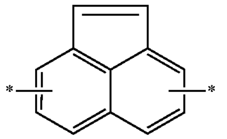

(T represents a hydrocarbon group having 1 to 3 carbon atoms, and b represents an integer of 0 to 4. When there are a plurality of T, the plurality of T may be the same as or different from each other. The symbol * indicates a bonding position.)

[4] The compound described in the aforementioned item [3], wherein in the formula (1), X represents (A) or (C) described in the formula (2), and Y represents (E) or (F) described in the formula (3).

[5] The compound described in the aforementioned item [4], wherein in the formula (1), p=0.

[6] A mixture containing the compound described in any one of the aforementioned items [1] to [5] and a polymerization inhibitor.

[7] A curable resin composition containing the compound described in any one of the aforementioned items [1] to [5] or the mixture described in the aforementioned item [6].

[8] The curable resin composition described in the aforementioned item [7], containing a polyphenylene ether compound.

[9] The curable resin composition described in the aforementioned item [7] or [8], containing a radical polymerization initiator.

[10]

A cured product obtained by curing the compound described in any one of the aforementioned items [1] to [5], the mixture according to the aforementioned item [6], or the curable resin composition described in any one of the aforementioned items [7] to [9].

[11]

A compound represented by the following formula (4).

(4)

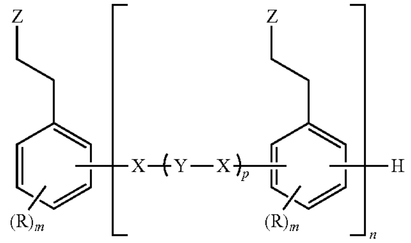

(In the formula (4), X and Y each represent a different optional organic group. When there are a plurality of X, the plurality of X may be the same as or different from each other. When there are a plurality of Y, the plurality of Y may be the same as or different from each other. Z represents a halogen element. A plurality of Z may be the same as or different from each other. R represents a hydrocarbon group having 1 to 10 carbon atoms or a halogenated alkyl group. When there are a plurality of R, the plurality of R may be the same as or different from each other. m represents an integer of 0 to 3, n represents a repeating unit and satisfies $1 \leq n \leq 20$, and p represents a repeating unit and satisfies $0 \leq p \leq 20$.)

[12] A method for producing the compound described in any one of the aforementioned items [1] to [5], the method including a step of subjecting the compound represented by the formula (4) described in the aforementioned item [11] to a dehydrohalogenation reaction in the presence of a basic catalyst.

Advantageous Effects of Invention

The compound of the present invention is excellent in curability, and the cured product thereof has excellent properties in high heat resistance and low dielectric properties. Therefore, the compound is a material useful for sealing of electric and electronic components, a circuit substrate, a carbon fiber composite material, and the like.

In addition, since the compound of the present invention is excellent in reactivity, it is also one of preferred aspects that the compound is cured alone.

DESCRIPTION OF EMBODIMENTS

Figure 1:
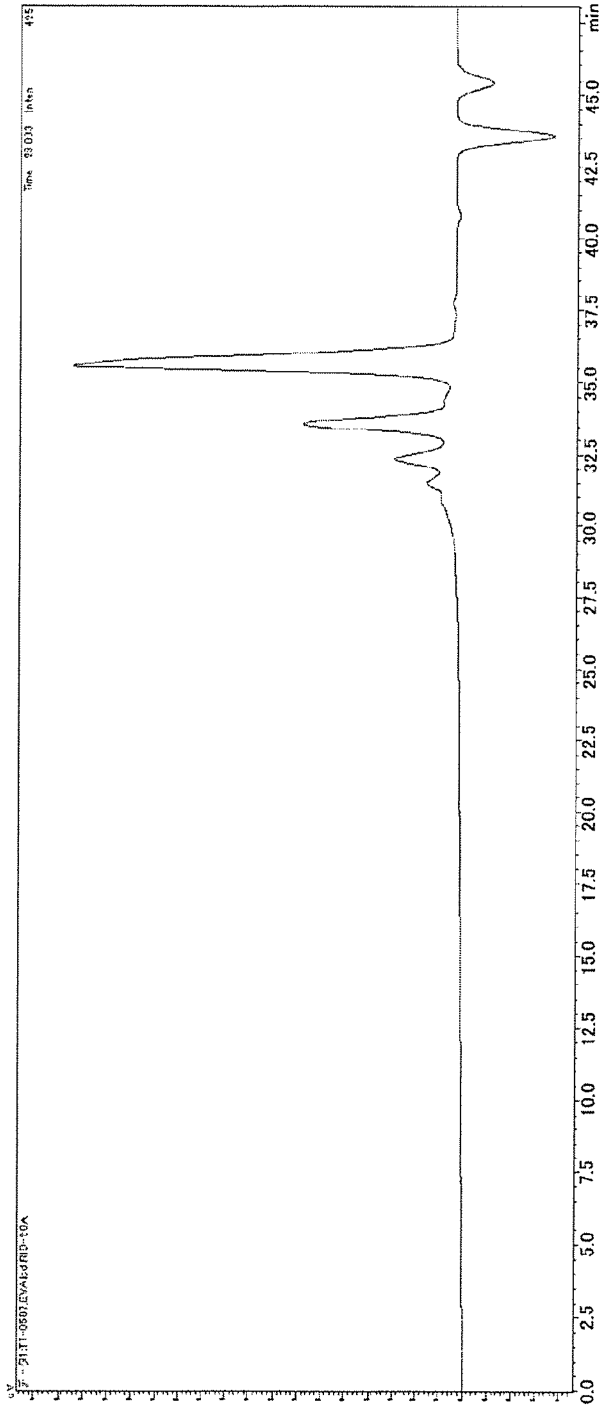
FIG. 1 is a GPC chart of Example 1.

A compound of the present invention is represented by the following formula (1).

(1)

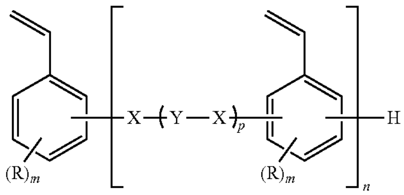

(In the formula (1), X and Y each represent a different optional organic group. When there are a plurality of X, the plurality of X may be the same as or different from each other. When there are a plurality of Y, the plurality of Y may be the same as or different from each other. R represents a hydrocarbon group having 1 to 10 carbon atoms or a halogenated alkyl group. When there are a plurality of R, the plurality of R may be the same as or different from each other. m represents an integer of 0 to 3, n represents a repeating unit and satisfies $1 \leq n \leq 20$, and p represents a repeating unit and satisfies $0 \leq p \leq 20$.)

In the formula (1), m is generally 0 to 3, preferably 0 to 2, and more preferably 0. n satisfies generally $1 \leq n \leq 20$, preferably $1.1 \leq n \leq 20$, more preferably $1.1 \leq n \leq 10$, and particularly preferably $1.1 \leq n \leq 5$. The value of n can be calculated from a value of the weight average molecular weight (Mw) of the compound determined by gel permeation chromatography (GPC) measurement. The weight average molecular weight is preferably 200 or more and less than 5,000, more preferably 300 or more and less than 3,000, and particularly preferably 400 or more and less than 2,000. When the weight average molecular weight is less than 5,000, purification by water washing becomes easy, and when the weight average molecular weight is 200 or more, the target compound is less likely to volatilize in the solvent distillation step.

In general, p satisfies $0 \leq p \leq 20$. The lower limit value is preferably 0 or 1. The upper limit value is generally 20, and is preferably 10, more preferably 5, particularly preferably 3, and most preferably 0.

R is generally a hydrocarbon group having 1 to 10 carbon atoms, preferably a hydrocarbon group having 1 to 5 carbon atoms, and more preferably a hydrocarbon group having 1 to 3 carbon atoms. When R is a hydrocarbon group having 10 or less carbon atoms, the compound is less likely to undergo molecular vibration when exposed to high frequencies. Therefore, the compound has excellent electrical properties.

In the formula (1), X represents preferably any one or more of (A) to (D) described in the following formula (2), more preferably (A) or (C), and particularly preferably (A). Due to a nonpolar and rigid structure, the distance between crosslinking points and the aromatic ring density derived from these structures, the cured product is excellent in various properties such as electrical properties, heat resistance, low water absorption, toughness (mechanical strength), adhesion, and flame retardancy.

(2)

(A)

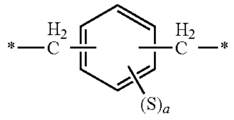

(B)

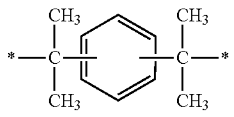

(C)

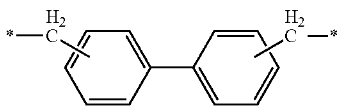

-continued (D)

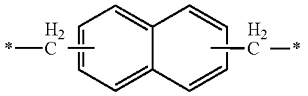

(S represents a hydrocarbon group having 1 to 3 carbon atoms, and a represents an integer of 0 to 4. When there are a plurality of S, the plurality of S may be the same as or different from each other. The symbol * indicates a bonding position.)

In the formula (2), S generally represents a hydrocarbon group having 1 to 3 carbon atoms, and is particularly preferably a methyl group. a generally represents an integer of 0 to 4, and is preferably 0 or 1, and particularly preferably 0.

In the formula (1), Y represents preferably any one or more of (E) to (K) described in the following formula (3), more preferably (E) or (F), and particularly preferably (E).

(3)

(E)

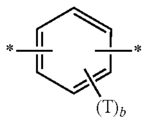

(F)

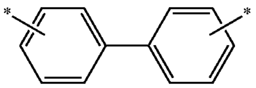

(G)

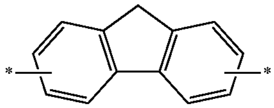

(H)

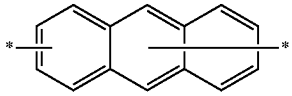

(I)

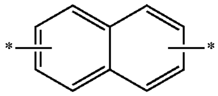

(J)

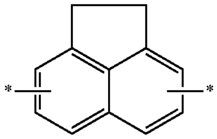

(K)

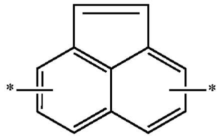

(T represents a hydrocarbon group having 1 to 3 carbon atoms, and b represents an integer of 0 to 4. When there are a plurality of T, the plurality of T may be the same as or different from each other. The symbol * indicates a bonding position.)

In the formula (3), T generally represents a hydrocarbon group having 1 to 3 carbon atoms, and is particularly preferably a methyl group. b generally represents an integer of 0 to 4, and is preferably 0 to 3, and particularly preferably 3.

The method for producing the compound represented by the formula (1) of the present invention is not particularly limited, but the compound can be derived from the compound represented by the following formula (4).

(4)

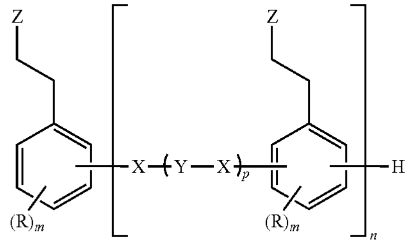

(In the formula (4), X and Y each represent a different optional organic group. When there are a plurality of X, the plurality of X may be the same as or different from each other. When there are a plurality of Y, the plurality of Y may be the same as or different from each other. Z represents a halogen atom. A plurality of Z may be the same as or different from each other. Each R independently represents a hydrocarbon group having 1 to 10 carbon atoms or a halogenated alkyl group. When there are a plurality of R, the plurality of R may be the same as or different from each other. m represents an integer of 0 to 3, n represents a repeating unit and satisfies $1 \leq n \leq 20$, and p represents a repeating unit and satisfies $0 \leq p \leq 20$.)

The preferred ranges of m, n, p, and R in the formula (4) are the same as those in the formula (1). Z preferably represents a bromine atom or a chlorine atom, and particularly preferably a bromine atom from the viewpoint of stability of the compound and easiness of progress of the dehydrohalogenation reaction.

The compound represented by the formula (1) of the present invention is derived from the compound represented by the formula (4). Specifically, the compound represented by the formula (1) can be obtained by a method of subjecting the compound represented by the formula (4) to a dehydrohalogenation reaction in a solvent in the presence of a basic catalyst. Examples of the solvent used include, but are not limited to, water-insoluble solvents, for example, aromatic solvents such as toluene and xylene, aliphatic solvents such as cyclohexane and n-hexane, ethers such as diethyl ether and diisopropyl ether, ester solvents such as ethyl acetate and butyl acetate, and ketone solvents such as methyl isobutyl ketone and cyclopentanone, and two or more kinds thereof may be used in combination. In addition to the water-insoluble solvents, an aprotic polar solvent may also be used in combination. Examples of the aprotic polar solvent include dimethylsulfone, dimethylsulfoxide, dimethylformamide, dimethylacetamide, 1,3-dimethyl-2-imidazolidinone, N-methylpyrrolidone, and the like, and two or more kinds thereof may be used in combination. When an aprotic polar solvent is used, it is preferable to use a solvent having a boiling point higher than that of the water-insoluble solvent used in combination. The catalyst is not particularly limited, and examples thereof include basic catalysts such as sodium hydroxide, potassium hydroxide, and potassium carbonate. Since it is difficult to cause the dehydrohalogenation reaction to progress completely, the aprotic polar solvent may be used in an excessively large amount with respect to the substrate, or the dehydrohalogenation reaction may be repeatedly performed twice or three or more times. For example, a solution obtained by carrying out the dehydrohalogenation reaction of the compound represented by the formula (4) in the presence of a basic catalyst in an organic solvent may be washed with water and then returned to a reaction vessel again, and the reaction may be carried out again by adding a basic catalyst. In this way, the degree of progress of the dehydrohalogenation reaction can be increased. That is, the amount of residual halogen contained in the target compound can be reduced. The amount of residual halogen is preferably 1 to 10,000 ppm, more preferably 1 to 1,000 ppm, still more preferably 1 to 500 ppm, in the desired product. When the amount of residual halogen contained in the compound represented by the formula (1) is large, molecular vibration occurs when the compound is exposed to a high frequency, and in particular, electrical properties such as dielectric loss tangent are adversely affected. In addition, when the amount of residual halogen is large, the risk of causing defects such as metal corrosion and ion migration increases when the composition containing the compound of the present invention and the cured product thereof are exposed to an environmental test such as a high accelerated stress test (HAST). Therefore, it is preferable to have the above-described halogen content.

A method for producing the compound represented by the formula (4) is not particularly limited, and for example, a compound having a 2-bromoethylbenzene structure may be allowed to react with a bishalogenated methylaryl compound in the presence of an acid catalyst such as hydrochloric acid, sulfonic acid, and active clay, or a compound having a 2-bromoethylbenzene structure may be allowed to react with a bishydroxymethylaryl compound in the presence of an acid catalyst such as hydrochloric acid, sulfonic acid, and activated clay. When sulfonic acid or the like is used as a catalyst, an extraction step may be performed after neutralization with an alkali metal such as sodium hydroxide and potassium hydroxide. In the extraction step, an aromatic hydrocarbon solvent such as toluene and xylene may be used alone, or a non-aromatic hydrocarbon such as cyclohexane or toluene may be used in combination. After the extraction, an organic layer is washed with water until the wastewater becomes neutral, and the solvent and the excess compound having a 2-bromoethylbenzene structure are distilled off using an evaporator or the like, and whereby a compound having at least two or more 2-bromoethylbenzene structures in a desired molecule can be obtained.

Examples of the compound having a 2-bromoethylbenzene structure include, but are not limited to, 2-bromoethylbenzene, 1-(2-bromoethyl)-2-methylbenzene, 1-(2-bromoethyl)-3-methylbenzene, 1-(2-bromoethyl)-4-methylbenzene, 1-(2-bromoethyl)-2,3-dimethylbenzene, 1-(2-bromoethyl)-2,4-dimethylbenzene, 1-(2-bromoethyl)-2,5-dimethylbenzene, and 1-(2-bromoethyl)-2,6-dimethylbenzene. When the number of carbon atoms is large, the solvent solubility is improved, but the heat resistance is lowered. Therefore, it is preferable that the 2-bromoethylbenzene structure is unsubstituted or substituted with an alkyl group having 1 to 3 carbon atoms, it is more preferable that the 2-bromoethylbenzene structure is unsubstituted or substituted with an alkyl group having 1 to 2 carbon atoms, and it is most preferable that the 2-bromoethylbenzene structure is unsubstituted or substituted with a methyl group.

Examples of the bishalogenated methylaryl compound include o-xylylene difluoride, m-xylylene difluoride, p-xylylene difluoride, o-xylylene dichloride, m-xylylene dichloride, p-xylylene dichloride, o-xylylene dibromide, m-xylylene dibromide, p-xylylene dibromide, o-xylylene diiodide, m-xylylene diiodide, p-xylylene diiodide, 4,4'-bisfluoromethylene biphenyl, 4,4'-bischloromethylene biphenyl, 4,4'-bisbromomethylene biphenyl, 4,4'-bisiodomethylene biphenyl, 2,4-bisfluoromethylene biphenyl, 2,4-bischloromethylene biphenyl, 2,4-bisbromomethylene biphenyl, 2,4-bisiodomethylene biphenyl, 2,2'-bisfluoromethylene biphenyl, 2,2'-bischloromethylene biphenyl, 2,2'-bisbromomethylene biphenyl, and 2,2'-bisiodomethylene biphenyl, and from the viewpoint of the reactivity of raw materials during synthesis, chloride compounds, bromide compounds, and iodide compounds are preferred, and chloride compounds and bromide compounds are more preferred. In addition, examples of the optional halogen compound include, but are not limited to, cyanuric fluoride, cyanuric chloride, cyanuric bromide, and cyanuric iodide.

Examples of the bishydroxymethylaryl compound include, but are not limited to, o-benzenedimethanol, m-benzenedimethanol, p-benzenedimethanol, 4,4'-bishydroxymethylbiphenyl, 2,4-bishydroxymethylbiphenyl, 2,2'-bishydroxymethylbiphenyl, α,α,α',α''-tetramethyl-1,4-benzenedimethanol, α,α,α',α'-tetramethyl-1,3-benzenedimethanol, and α,α,α',α'-tetramethyl-1,2-benzenedimethanol. One of these may be used alone, or two or more kinds thereof may be used in combination. The usage amount of the compound is preferably 0.05 to 0.8 mass %, and more preferably 0.1 to 0.6 mass %, based on 1 mass % of the compound having a 2-bromoethylbenzene structure.

In the reaction of a compound having a 2-bromoethylbenzene structure with a halogenated methylaryl compound or the like, it is possible to use, as a catalyst, hydrochloric acid, phosphoric acid, sulfuric acid, formic acid, p-toluenesulfonic acid, methanesulfonic acid, a Lewis acid such as aluminum chloride and zinc chloride, a solid acid such as activated clay, acid clay, white carbon, zeolite, and silica alumina, and an acidic ion exchange resin as necessary. One of these may be used alone, or two or more kinds thereof may be used in combination. The usage amount of the catalyst is generally 0.1 to 0.8 mol, and preferably 0.2 to 0.7 mol, based on 1 mol of the compound having a 2-bromoethylbenzene structure to be used. If the usage amount of the catalyst is too large, the viscosity of the reaction solution may be too high and stirring may be difficult, and if the usage amount is too small, the progress of the reaction may be slow. The reaction may be carried out by selecting and using an organic solvent, such as hexane, cyclohexane, octane, toluene and xylene, as necessary, or may be carried out without any solvent. For example, after an acidic catalyst is added to a mixed solution of a compound having a 2-bromoethylbenzene structure, a halogenated methylaryl compound, and a solvent, water contained by the catalyst is removed from the system by azeotrope. Thereafter, the reaction is performed at 40 to 180° C., preferably 50 to 170° C. for 0.5 to 20 hours. After the end of the reaction, the acidic catalyst may be neutralized with an alkaline aqueous solution, but the process may proceed to a water washing step without neutralization. In the water washing step, a water-insoluble organic solvent is added to the oil layer, and water washing is repeated until the wastewater becomes neutral.

The softening point of the compound represented by the formula (4) is preferably 80° C. or lower, and more preferably 70° C. or lower. When the softening point is 80° C. or lower, the viscosity of the compound represented by the formula (1) decreases. Accordingly, it is easy to ensure the fluidity, and it is easy to achieve B-stage such as prepreg, in addition to preventing the impregnation property to glass cloth, carbon fibers, and the like from being impaired. When the amount of a dilution solvent is increased to reduce the viscosity, there is a possibility that a resin does not sufficiently adhere to a fibrous material in an impregnation step.

A mixture of the present invention may contain a polymerization inhibitor. By containing a polymerization inhibitor, the storage stability can be improved and the reaction initiation temperature can be controlled. By controlling the reaction initiation temperature, the fluidity can be easily ensured, the impregnation property to glass cloth or the like is not impaired, and the B-stage such as the prepreg can be easily achieved. When the polymerization reaction progresses too much at the time of achieving the prepreg, defects such as difficulty in lamination in a lamination step are likely to occur.

Examples of the polymerization inhibitor that can be used include phenol-based polymerization inhibitors, sulfur-based polymerization inhibitors, phosphorus-based polymerization inhibitors, hindered amine-based polymerization inhibitors, nitroso-based polymerization inhibitors, and nitroxyl radical-based polymerization inhibitors. The polymerization inhibitor may be added when the compound represented by the formula (1) is synthesized, or may be added after the synthesis. In addition, one of the polymerization inhibitors may be added alone, or two or more kinds thereof may be added in combination. The usage amount of the polymerization inhibitor is generally 0.008 to 1 part by weight, and preferably 0.01 to 0.5 parts by weight, based on 100 parts by weight of the resin component. One of these polymerization inhibitors may be used alone, or two or more kinds thereof may be used in combination. In the present invention, the phenol-based polymerization inhibitors, the hindered amine-based polymerization inhibitors, the nitroso-based polymerization inhibitors, and the nitroxyl radical-based polymerization inhibitors are preferred.

Specific examples of the phenol-based polymerization inhibitors include monophenols such as 2,6-di-t-butyl-p-cresol, butylated hydroxyanisole, 2,6-di-t-butyl-p-ethylphenol, stearyl-β-(3,5-di-t-butyl-4-hydroxyphenyl) propionate, isooctyl-3-(3,5-di-t-butyl-4-hydroxyphenyl) propionate, 2,4-bis-(n-octylthio)-6-(4-hydroxy-3,5-di-t-butylanilino)-1,3,5-triazine, and 2,4-bis[(octylthio) methyl]-o-cresol; bisphenols such as 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidenebis(3-methyl-6-t-butylphenol), triethylene glycol-bis[3-(3-t-butyl-5-methyl-4-hydroxyphenyl) propionate], 1,6-hexanediol bis [3-(3,5-di-t-butyl-4-hydroxyphenyl) propionate], N,N'-hexamethylenebis(3,5-di-t-butyl-4-hydroxy-hydrocinnamamide), 2,2-thio-diethylene bis[3-(3,5-di-t-butyl-4-hydroxyphenyl) propionate], 3,5-di-t-butyl-4-hydroxybenzylphosphonate-diethyl ester, 3,9-bis[1,1-dimethyl-2-{β-(3-t-butyl-4-hydroxy-5-methylphenyl) propionyloxy} ethyl]-2,4,8,10-tetraoxaspiro[5,5]undecane, and bis(ethyl 3,5-di-t-butyl-4-hydroxybenzylsulfonate) calcium; and polymeric phenols such as 1,1,3-tris(2-methyl-4-hydroxy-5-t-butylphenyl) butane, 1,3,5-trimethyl-2,4,6-tris (3,5-di-t-butyl-4-hydroxybenzyl) benzene, tetrakis-[methylene-3-(3',5'-di-t-butyl-4'-hydroxyphenyl) propionate] methane, bis[3,3'-bis-(4'-hydroxy-3'-t-butylphenyl) butyric acid] glycol ester, tris-(3,5-di-t-butyl-4-hydroxybenzyl)-isocyanurate, 1,3,5-tris(3',5'-di-t-butyl-4'-hydroxybenzyl)-S-triazine-2,4,6-(1H,3H,5H) trione, and tocopherol.

Specific examples of the sulfur-based polymerization inhibitors include dilauryl-3,3'-thiodipropionate, dimyristyl-3,3'-thiodipropionate, and distearyl-3,3'-thiodipropionate.

Specific examples of the phosphorus-based polymerization inhibitor include phosphites such as triphenyl phosphite, diphenyl isodecyl phosphite, phenyl diisodecyl phosphite, tris(nonylphenyl) phosphite, diisodecyl pentaerythritol phosphite, tris(2,4-di-t-butylphenyl) phosphite, cyclic neopentanetetraylbis(octadecyl) phosphite, cyclic neopentanetetraylbis(2,4-di-t-butylphenyl) phosphite, cyclic neopentanetetraylbis(2,4-di-t-butyl-4-methylphenyl) phosphite, and bis[2-t-butyl-6-methyl-4-{2-(octadecyloxycarbonyl) ethyl} phenyl] hydrogen phosphite; and oxaphosphaphenanthrene oxides such as 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, and 10-decyloxy-9,10-dihydro-9-oxa-10-phosphaphenanthrene-10-oxide.

Specific examples of the hindered amine-based polymerization inhibitors include, but are not limited to, ADK STAB LA-40MP, ADK STAB LA-40Si, ADK STAB LA-402AF, ADK STAB LA-87, DK STAB LA-82, DK STAB LA-81, ADK STAB LA-77Y, ADK STAB LA-77G, ADK STAB LA-72, ADK STAB LA-68, ADK STAB LA-63P, ADK STAB LA-57, ADK STAB LA-52, Chimassorb 2020FDL, Chimassorb 944FDL, Chimassorb 944LD, Tinuvin 622SF, Tinuvin PA144, Tinuvin 765, Tinuvin 770DF, Tinuvin XT55FB, Tinuvin 111FDL, Tinuvin 783FDL, and Tinuvin 791FB.

Specific examples of the nitroso-based polymerization inhibitor include p-nitrosophenol, N-nitrosodiphenylamine, an ammonium salt of N-nitrosophenylhydroxyamine (cupferron), and preferably an ammonium salt of N-nitrosophenylhydroxyamine (cupferron).

Specific examples of the nitroxyl radical-based polymerization inhibitors include, but are not limited to, di-tert-butyl nitroxide, 2,2,6,6-tetramethylpiperidine-1-oxyl, 4-hydroxy-2,2,6,6-tetramethylpiperidine-1-oxyl, 4-oxo-2,2,6,6-tetramethylpiperidine-1-oxyl, 4-amino-2,2,6,6-tetramethylpiperidine-1-oxyl, 4-methoxy-2,2,6,6-tetramethylpiperidine-1-oxyl, 4-acetoxy-2,2,6,6-tetramethylpiperidine-1-oxyl, and 4-benzoyloxy-2,2,6,6-tetramethylpiperidine-1-oxyl.

A curable resin composition of the present invention may contain any known material as a curable resin other than the compound represented by the formula (1) or the mixture containing the compound represented by the formula (1). Specific examples thereof include a phenol resin, an epoxy resin, an amine resin, an active alkene-containing resin, an isocyanate resin, a polyamide resin, a polyimide resin, a cyanate ester resin, a propenyl resin, a methallyl resin, and an active ester resin, and one kind of these resins may be used, or a plurality thereof may be used in combination. From the viewpoint of the balance of heat resistance, adhesion, and dielectric properties, it is preferable to contain an epoxy resin, an active alkene-containing resin, and a cyanate ester resin. When these curable resins are contained, it is possible to improve the brittleness of the cured product and the adhesion to the metal, and it is possible to prevent the crack of the package in a reliability test such as the solder reflow and the thermal cycle.

The usage amount of the curable resin is preferably 10 times by mass or less, more preferably 5 times by mass or less, and particularly preferably 3 times by mass or less relative to the usage amount of the compound represented by the formula (1). The lower limit is preferably 0.5 times by mass or more, and more preferably 1 time by mass or more. When the usage amount is 10 times by mass or less, the effects of the heat resistance and dielectric properties of the compound represented by the formula (1) can be utilized.

As the phenol resin, the epoxy resin, the amine resin, the active alkene-containing resin, the isocyanate resin, the polyamide resin, the polyimide resin, the cyanate ester resin, and the active ester resin, those exemplified below can be used.

Examples of the phenol resin include polycondensates of phenols (phenols, alkyl-substituted phenols, aromatic-substituted phenols, hydroquinone, resorcin, naphthol, alkyl-substituted naphthol, dihydroxybenzene, alkyl-substituted dihydroxybenzene, dihydroxynaphthalene, or the like) and various aldehydes (formaldehyde, acetaldehyde, alkylaldehyde, benzaldehyde, alkyl-substituted benzaldehyde, hydroxybenzaldehyde, naphthaldehyde, glutaraldehyde, phthalaldehyde, crotonaldehyde, cinnamaldehyde, furfural, or the like), polymers of phenols and various diene compounds (dicyclopentadiene, terpenes, vinylcyclohexene, norbomadiene, vinylnorbornene, tetrahydroindene, divinylbenzene, divinylbiphenyl, diisopropenylbiphenyl, butadiene, isoprene, or the like), polycondensates of phenols and ketones (acetone, methyl ethyl ketone, methyl isobutyl ketone, acetophenone, benzophenone, or the like), phenol resins obtained by polycondensation of phenols and substituted biphenyls (4,4'-bis(chloromethyl)-1,1'-biphenyl, 4,4'-bis(methoxymethyl)-1,1'-biphenyl, or the like) or substituted phenyls (1,4-bis(chloromethyl) benzene, 1,4-bis (methoxymethyl) benzene, 1,4-bis(hydroxymethyl) benzene, or the like), polycondensates of bisphenols and various aldehydes, and polyphenylene ether compounds.

Any known polyphenylene ether compound may be used, but from the viewpoint of heat resistance and electrical properties, a polyphenylene ether compound having an ethylene unsaturated double bond is preferred, and a polyphenylene ether compound having an acryloyl group, a methacrylic group, or a styrene structure is more preferred. Examples of commercially available products include SA-9000-111 (a polyphenylene ether compound having a methacrylic group, manufactured by SABIC) and OPE-2St 1200 (a polyphenylene ether compound having a styrene structure, manufactured by Mitsubishi Gas Chemical Company, Inc.).

The number average molecular weight (Mn) of the polyphenylene ether compound is preferably 500 to 5,000, more preferably 2,000 to 5,000, and still more preferably 2,000 to 4,000. When the number average molecular weight is less than 500, sufficient heat resistance of the cured product tends not to be obtained. When the number average molecular weight is more than 5,000, the melt viscosity increases and sufficient fluidity cannot be obtained, and thus molding failure tends to easily occur. In addition, there is a tendency that the reactivity is also lowered, a long time is required for the curing reaction, unreacted materials are increased without being incorporated into the curing system, the glass transition temperature of the cured product is lowered, and the heat resistance of the cured product is lowered.

When the number average molecular weight of the polyphenylene ether compound is 500 to 5,000, excellent heat resistance, moldability and the like can be exhibited while excellent dielectric properties are maintained. The number average molecular weight herein can be specifically measured by gel permeation chromatography or the like.

The polyphenylene ether compound may be obtained by a polymerization reaction or may be obtained by a redistribution reaction of a high molecular weight polyphenylene ether compound having a number average molecular weight of about 10,000 to 30,000. In addition, radical polymerizability may be imparted by causing these raw materials with a compound having an ethylene unsaturated double bond, such as methacrylic chloride, acrylic chloride, and chloromethylstyrene. The polyphenylene ether compound obtained by the redistribution reaction is obtained, for example, by heating a high molecular weight polyphenylene ether compound in a solvent such as toluene in the presence of a phenol compound and a radical initiator to cause a redistribution reaction. The polyphenylene ether compound obtained by the redistribution reaction as described above has hydroxyl groups, derived from a phenolic compound contributing to curing, at both ends of the molecular chain, so that the polyphenylene ether compound is preferred from the viewpoint that higher heat resistance can be maintained, and in addition, a functional group can be introduced at both ends of a molecular chain even after the modification with a compound having an ethylene unsaturated double bond. In addition, the polyphenylene ether compound obtained by the polymerization reaction is preferred from the viewpoint of exhibiting excellent fluidity.

The molecular weight of the polyphenylene ether compound can be adjusted by adjusting polymerization conditions or the like in the case of the polyphenylene ether compound obtained by the polymerization reaction. In the case of the polyphenylene ether compound obtained by the redistribution reaction, the molecular weight of the polyphenylene ether compound to be obtained can be adjusted by adjusting the conditions of the redistribution reaction and the like. More specifically, it is conceivable to adjust the blending amount of the phenolic compound used in the redistribution reaction. That is, as the blending amount of the phenolic compound increases, the molecular weight of the obtained polyphenylene ether compound decreases. At this time, poly(2,6-dimethyl-1,4-phenylene ether) or the like can be used as the high molecular weight polyphenylene ether compound subjected to the redistribution reaction. The phenolic compound used in the redistribution reaction is not particularly limited, and for example, a polyfunctional phenolic compound having two or more phenolic hydroxyl groups in a molecule, such as bisphenol A, phenol novolac, and cresol novolac, is preferably used. One of these may be used alone, or two or more kinds thereof may be used in combination.

The content of the polyphenylene ether compound is not particularly limited, and is preferably 10 to 90 mass %, and more preferably 20 to 80 mass %, based on the total mass of the curable resin components. The content of the polyphenylene ether compound being 10 to 90 mass % is preferred from the viewpoint that not only excellent heat resistance is obtained, but also a cured product in which excellent dielectric properties of the polyphenylene ether compound are sufficiently exhibited is obtained.

Examples of the epoxy resin include a glycidyl ether-based epoxy resin obtained by glycidylation of the phenol resin, alcohols, or the like, an alicyclic epoxy resin represented by 4-vinyl-1-cyclohexene diepoxide, 3,4-epoxycyclohexylmethyl-3,4'-epoxycyclohexanecarboxylate, or the like, a glycidyl amine-based epoxy resin represented by tetraglycidyl diaminodiphenylmethane (TGDDM), triglycidyl-p-aminophenol, or the like, and a glycidyl ester-based epoxy resin.

Examples of the amine resin include: an aniline resin that is obtained by a reaction of xylylene chloride and diaminodiphenylmethane, diaminodiphenylsulfone, isophoronediamine, naphthalene diamine, aniline novolac, orthoethylaniline novolac, and aniline; and aniline and substituted biphenyls (4,4'-bis(chloromethyl)-1,1'-biphenyl, 4,4'-bis (methoxymethyl)-1,1'-biphenyl, or the like) described in Japanese Patent No. 6429862, or substituted phenyls (1,4-bis(chloromethyl) benzene, 1,4-bis(methoxymethyl) benzene, 1,4-bis(hydroxymethyl) benzene, or the like).

Examples of the active alkene-containing resin include: a polycondensate of the above-described phenol resin and an active alkene-containing halogen-based compound (chloromethylstyrene, allyl chloride, methallyl chloride, acrylic acid chloride, allyl chloride, or the like); a polycondensate of active alkene-containing phenols (2-allylphenol, 2-propenylphenol, 4-allylphenol, 4-propenylphenol, eugenol, isoeugenol, or the like) and halogen-based compounds (4,4'-bis(methoxymethyl)-1,1'-biphenyl, 1,4-bis(chloromethyl) benzene, 4,4'-difluorobenzophenone, 4,4'-dichlorobenzophenone, 4,4'-dibromobenzophenone, cyanuric chloride, or the like); a polycondensate of epoxy resins or alcohols and substituted or unsubstituted acrylates (acrylate, methacrylate, or the like); a maleimide resin (4,4'-diphenylmethanebismaleimide, polyphenylmethanemaleimide, m-phenylenebismaleimide, 2,2'-bis[4-(4-maleimidephenoxy) phenyl] propane, 3,3'-dimethyl-5,5'-diethyl-4,4'-diphenylmethanebismaleimide, 4-methyl-1,3-phenylenebismaleimide, 4,4'-diphenylether bismaleimide, 4,4'-diphenylsulfonebismaleimide, 1,3-bis(3-maleimidephenoxy) benzene, 1,3-bis(4-maleimidephenoxy) benzene); a zyloc-type maleimide resin (anilix maleimide, manufactured by Mitsui Fine Chemicals, Inc.); a biphenyl aralkyl type maleimide resin (obtained by solidifying a resin solution containing a maleimide resin (M2) described in Example 4 of JP-A-2009-001783 by distilling off a solvent thereof under reduced pressure); and bisaminocumylbenzene-type maleimide (maleimide resin described in WO 2020/054601).

Examples of the isocyanate resin include: aromatic diisocyanates such as p-phenylene diisocyanate, m-phenylene diisocyanate, p-xylene diisocyanate, m-xylene diisocyanate, 2,4-toluene diisocyanate, 2,6-toluene diisocyanate, 4,4'-diphenylmethane diisocyanate, and naphthalene diisocyanate; aliphatic or alicyclic diisocyanates such as isophorone diisocyanate, hexamethylene diisocyanate, 4,4'-dicyclohexylmethane diisocyanate, hydrogenated xylene diisocyanate, norbornene diisocyanate, and lysine diisocyanate; polyisocyanates such as one or more kinds of biuret compounds of isocyanate monomers or isocyanate compounds obtained by trimerization of the diisocyanate compounds; and polyisocyanates obtained by a urethanation reaction between the isocyanate compound and a polyol compound.

Examples of the polyamide resin include polymers mainly made from one or more selected from amino acids (6-aminocaproic acid, 11-aminoundecanoic acid, 12-aminododecanoic acid, paraaminomethylbenzoic acid, or the like), lactams (s-caprolactam, co-undecanelactam or co-laurolactam), diamines (aliphatic diamines such as ethylenediamine, trimethylenediamine, tetramethylenediamine, pentamethylenediamine, hexamethylenediamine, heptamethylenediamine, octamethylenediamine, nonamethylenediamine, decanediamine, undecanediamine, dodecanediamine, tridecanediamine, tetradecanediamine, pentadecanediamine, hexadecanediamine, heptadecanediamine, octadecanediamine, nonadecanediamine, eicosanediamine, 2-methyl-1,5-diaminopentane, and 2-methyl-1,8-diaminooctane; alicyclic diamines such as cyclohexanediamine, bis-(4-aminocyclohexyl) methane, and bis(3-methyl-4-aminocyclohexyl) methane; and aromatic diamines such as xylylenediamine) and dicarboxylic acids (aliphatic dicarboxylic acids such as oxalic acid, malonic acid, succinic acid, glutaric acid, adipic acid, suberic acid, azelaic acid, sebacic acid, undecanedioic acid, and dodecanedioic acid; aromatic dicarboxylic acids such as terephthalic acid, isophthalic acid, 2-chloroterephthalic acid, 2-methylterephthalic acid, 5-methylisophthalic acid, 5-sodium sulfoisophthalic acid, hexahydroterephthalic acid, and hexahydroisophthalic acid; alicyclic dicarboxylic acids such as cyclohexanedicarboxylic acid; and dialkyl esters and dichlorides of these dicarboxylic acids).

Examples of the polyimide resin include polycondensates of the above-described diamine and tetracarboxylic dianhydrides (4,4'-(hexafluoroisopropylidene) diphthalic anhydride, 5-(2,5-dioxotetrahydro-3-furanyl)-3-methyl-cyclohexene-1,2-dicarboxylic anhydride, pyromellitic dianhydride, 1,2,3,4-benzenetetracarboxylic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 3,3',4,4'-diphenylsulfonetetracarboxylic dianhydride, 2,2',3,3'-biphenyltetracarboxylic dianhydride, methylene-4,4'-diphthalic dianhydride, 1,1-ethylidene-4,4'-diphthalic dianhydride, 2,2'-propylidene-4,4'-diphthalic dianhydride, 1,2-ethylene-4,4'-diphthalic dianhydride, 1,3-trimethylene-4,4'-diphthalic dianhydride, 1,4-tetramethylene-4,4'-diphthalic dianhydride, 1,5-pentamethylene-4,4'-diphthalic dianhydride, 4,4'-oxydiphthalic dianhydride, thio-4,4'-diphthalic dianhydride, sulfonyl-4,4'-diphthalic dianhydride, 1,3-bis(3,4-dicarboxyphenyl) benzene dianhydride, 1,3-bis(3,4-dicarboxyphenoxy) benzene dianhydride, 1,4-bis(3,4-dicarboxyphenoxy) benzene dianhydride, 1,3-bis[2-(3,4-dicarboxyphenyl)-2-propyl] benzene dianhydride, 1,4-bis[2-(3,4-dicarboxyphenyl)-2-propyl] benzene dianhydride, bis[3-(3,4-dicarboxyphenoxy) phenyl] methane dianhydride, bis[4-(3,4-dicarboxyphenoxy) phenyl] methane dianhydride, 2,2-bis[3-(3,4-dicarboxyphenoxy) phenyl] propane dianhydride, 2,2-bis[4-(3,4-dicarboxyphenoxy) phenyl] propane dianhydride, bis(3,4-dicarboxyphenoxy) dimethylsilane dianhydride, 1,3-bis(3,4-dicarboxyphenyl)-1,1,3,3-tetramethyldisiloxane dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, ethylenetetracarboxylic dianhydride, 1,2,3,4-butanetetracarboxylic dianhydride, 1,2,3,4-cyclobutanetetracarboxylic dianhydride, cyclopentanetetracarboxylic dianhydride, cyclohexane-1,2,3,4-tetracarboxylic dianhydride, cyclohexane-1,2,4,5-tetracarboxylic dianhydride, 3,3',4,4'-bicyclohexyltetracarboxylic dianhydride, carbonyl-4,4'-bis(cyclohexane-1,2-dicarboxylic acid) dianhydride, methylene-4,4'-bis(cyclohexane-1,2-dicarboxylic acid) dianhydride, 1,2-ethylene-4,4'-bis(cyclohexane-1,2-dicarboxylic acid) dianhydride, 1,1-ethylidene-4,4'-bis(cyclohexane-1,2-dicarboxylic acid) dianhydride, 2,2-propylidene-4,4'-bis(cyclohexane-1,2-dicarboxylic acid) dianhydride, oxy-4,4'-bis(cyclohexane-1,2-dicarboxylic acid) dianhydride, thio-4,4'-bis(cyclohexane-1,2-dicarboxylic acid) dianhydride, sulfonyl-4,4'-bis(cyclohexane-1,2-dicarboxylic acid) dianhydride, bicyclo[2,2,2] oct-7-ene-2,3,5,6-tetracarboxylic dianhydride, rel-[1S,5R,6R]-3-oxabicyclo[3,2,1] octane-2,4-dione-6-spiro-3'-(tetrahydrofuran-2',5'-dione), 4-(2,5-dioxotetrahydrofuran-3-yl)-1,2,3,4-tetrahydronaphthalene-1,2-dicarboxylic anhydride, ethylene glycol-bis-(3,4-dicarboxylic acid anhydride phenyl) ether, 4,4'-biphenylbis(trimellitic acid monoesteric anhydride), and 9,9'-bis(3,4-dicarboxyphenyl) fluorene dianhydride).

The cyanate ester resin is a cyanate ester compound obtained by allowing a phenol resin to react with cyan halide, and specific examples thereof include, but are not limited to, dicyanato benzene, tricyanato benzene, dicyanato naphthalene, dicyanato biphenyl, 2,2'-bis(4-cyanatophenyl) propane, bis(4-cyanatophenyl) methane, bis(3,5-dimethyl-4-cyanatophenyl) methane, 2,2'-bis(3,5-dimethyl-4-cyanatophenyl) propane, 2,2'-bis(4-cyanato phenyl) ethane, 2,2'-bis(4-cyanato phenyl) hexafluoropropane, bis(4-cyanatophenyl) sulfone, bis(4-cyanatophenyl) thioether, phenol novolac cyanate, and a compound obtained by converting a hydroxyl group of a phenol/dicyclopentadiene co-condensate into a cyanate group.

In addition, cyanate ester compounds described in JP-A-2005-264154 are particularly preferred as cyanate ester compounds because they are excellent in low hygroscopicity, flame retardancy, and dielectric properties.

If necessary, the cyanate ester resin may contain a catalyst such as zinc naphthenate, cobalt naphthenate, copper naphthenate, lead naphthenate, zinc octylate, tin octylate, lead acetylacetonate, or dibutyltin maleate in order to trimerize the cyanate groups to form a sym-triazine ring. The catalyst is generally used in an amount of 0.0001 to 0.10 parts by mass, preferably 0.00015 to 0.0015 parts by mass, based on the total mass (100 parts by mass) of the curable resin composition.

As to the active ester resin, a compound having one or more active ester groups in one molecule, such as an epoxy resin, may be used as a curing agent for a curable resin other than the compound represented by the formula (1) of the present invention, if necessary. The active ester-based curing agent is preferably a compound having two or more ester groups having high reaction activity in one molecule, such as phenol esters, thiophenol esters, N-hydroxyamine esters, and esters of heterocyclic hydroxy compounds. The active ester-based curing agent is preferably obtained by a condensation reaction between at least one compound of a carboxylic acid compound and a thiocarboxylic acid compound, and at least one compound of a hydroxy compound and a thiol compound. In particular, from the viewpoint of improving heat resistance, an active ester-based curing agent obtained from a carboxylic acid compound and a hydroxy compound is preferred, and an active ester-based curing agent obtained from a carboxylic acid compound and at least one compound of a phenol compound and a naphthol compound is preferred.

Examples of the carboxylic acid compound include benzoic acid, acetic acid, succinic acid, maleic acid, itaconic acid, phthalic acid, isophthalic acid, terephthalic acid, and pyromellitic acid.

Examples of the phenol compound or the naphthol compound include hydroquinone, resorcin, bisphenol A, bisphenol F, bisphenol S, phenolphthalin, methylated bisphenol A, methylated bisphenol F, methylated bisphenol S, phenol, o-cresol, m-cresol, p-cresol, catechol, α-naphthol, β-naphthol, 1,5-dihydroxynaphthalene, 1,6-dihydroxynaphthalene, 2,6-dihydroxynaphthalene, dihydroxybenzophenone, trihydroxybenzophenone, tetrahydroxybenzophenone, phloroglucin, benzenetriol, dicyclopentadiene type diphenol compounds, and phenol novolac. Here, the "dicyclopentadiene type diphenol compound" refers to a diphenol compound obtained by condensing two molecules of phenol to one molecule of dicyclopentadiene.

Preferred specific examples of the active ester-based curing agent include an active ester compound containing a dicyclopentadiene type diphenol structure, an active ester compound containing a naphthalene structure, an active ester compound containing an acetylated phenol novolac, and an active ester compound containing a benzoylated phenol novolac. Among them, the active ester compound containing a naphthalene structure and the active ester compound containing a dicyclopentadiene type diphenol structure are more preferred. The "dicyclopentadiene type diphenol structure" represents a divalent structural unit composed of phenylene-dicyclopentylene-phenylene.

Examples of commercially available products of the active ester-based curing agent include: "EXB9451", "EXB9460", "EXB9460S", "HPC-8000-65T" "HPC-8000H-65TM", "EXB-8000L-65TM", and "EXB-8150-65T" (manufactured by DIC Corporation) as active ester compounds containing a dicyclopentadiene type diphenol structure; "EXB9416-70BK" (manufactured by DIC Corporation) as an active ester compound containing a naphthalene structure; "DC808" (manufactured by Mitsubishi Chemical Corporation) as an active ester compound containing an acetylated phenol novolac; "YLH1026", "YLH1030", and "YLH1048" (manufactured by Mitsubishi Chemical Corporation) as active ester compounds containing a benzoylated phenol novolac; "DC808" (manufactured by Mitsubishi Chemical Corporation) as an active ester-based curing agent containing an acetylated phenol novolac; and "EXB-9050L-62M" (manufactured by DIC Corporation) as an active ester-based curing agent containing a phosphorus atom.

The curable resin composition of the present invention can also improve the curability by being used in combination with a curing accelerator (curing catalyst). As a specific example of the curing accelerator that can be used, it is preferable to use a radical polymerization initiator for the purpose of promoting self-polymerization of a radically polymerizable curable resin such as an olefin compound or a maleimide resin, or radical polymerization with other components. Examples of the radical polymerization initiators that can be used include, but are not limited to, known curing accelerators: ketone peroxides such as methyl ethyl ketone peroxide and acetylacetone peroxide; diacyl peroxides such as benzoyl peroxide; dialkyl peroxides such as dicumyl peroxide and 1,3-bis(t-butylperoxyisopropyl)-benzene; peroxyketals such as t-butylperoxybenzoate and 1,1-di-t-butylperoxycyclohexane; alkyl peresters such as α-cumylperoxyneodecanoate, t-butylperoxyneodecanoate, t-butylperoxypivalate, 1,1,3,3-tetramethylbutylperoxy-2-ethylhexanoate, t-mylperoxy-2-ethylhexanoate, t-butylperoxy-2-ethylhexanoate, t-amylperoxy-3,5,5-trimethylhexanoate, t-butylperoxy-3,5,5-trimethylhexanoate and t-amylperoxybenzoate; peroxycarbonates such as di-2-ethylhexyl peroxydicarbonate, bis(4-t-butylcyclohexyl) peroxydicarbonate, t-butylperoxyisopropyl carbonate and 1,6-bis(t-butylperoxycarbonyloxy) hexane; organic peroxides such as t-butyl hydroperoxide, cumene hydroperoxide, t-butylperoxyoctoate, and lauroyl peroxide; and azo compounds such as azobisisobutyronitrile, 4,4'-azobis(4-cyanovaleric acid) and 2,2'-azobis(2,4-dimethylvaleronitrile). The ketone peroxides, diacyl peroxides, hydroperoxides, dialkyl peroxides, peroxyketals, alkyl peresters, percarbonates, and the like are preferred, and the dialkyl peroxides are more preferred. The addition amount of the radical polymerization initiator is preferably 0.01 to 5 parts by mass, and particularly preferably 0.01 to 3 parts by mass, based on 100 parts by mass of the curable resin composition. When the amount of the radical polymerization initiator used is large, the molecular weight does not sufficiently extend during the polymerization reaction.

If necessary, a curing accelerator other than the radical polymerization initiator may be added or used in combination. Specific examples of the curing accelerator that can be used include: imidazoles such as 2-methylimidazole, 2-ethylimidazole, and 2-ethyl-4-methylimidazole; tertiary amines such as 2-(dimethylaminomethyl) phenol and 1,8-diaza-bicyclo (5,4,0) undecene-7; phosphines such as triphenylphosphine; quaternary ammonium salts such as tetra-butylammonium salt, triisopropylmethylammonium salt, trimethyldecanylammonium salt, cetyltrimethylammonium salt, and hexadecyltrimethylammonium hydroxide; quaternary phosphonium salts such as triphenylbenzylphosphonium salt, triphenylethylphosphonium salt, and tetra-butylphosphonium salt (the counter ions of the quaternary salts are not particularly specified, and examples thereof include halogen, organic acid ions, and hydroxide ions in which organic acid ions and hydroxide ions are particularly preferred.); and transition metal compounds (transition metal salts) such as zinc compounds, for example, tin octylates, zinc carboxylates (zinc 2-ethylhexanate, zinc stearate, zinc behenate, zinc mistylate) and zinc phosphate esters (zinc octyl phosphate, zinc stearyl phosphate, or the like). The blending amount of the curing accelerator is 0.01 to 5.0 parts by weight based on 100 parts by weight of the epoxy resin.

The curable resin composition of the present invention may contain a phosphorus-containing compound as a flame retardation-imparting component. The phosphorus-containing compound may be a reactive compound or an addition-type compound. Specific examples of the phosphorus-containing compound include: phosphoric acid esters such as trimethyl phosphate, triethyl phosphate, tricresyl phosphate, trixylenyl phosphate, cresyl diphenyl phosphate, cresyl di-2,6-xylenyl phosphate, 1,3-phenylenebis(dixylenyl phosphate), 1,4-phenylene bis(dixylenyl phosphate), and 4,4'-biphenyl (dixylenyl phosphate); phosphanes such as 9,10-dihydro-9-oxa-10-phosphaphenanthrene-10-oxide and 10-(2,5-dihydroxyphenyl)-10H-9-oxa-10-phosphaphenanthrene-10-oxide; phosphorus-containing epoxy compounds obtained by allowing an epoxy resin to react with active hydrogens of the phosphanes; and red phosphorus. The phosphoric acid esters, the phosphanes, and the phosphorus-containing epoxy compounds are preferred, and 1,3-phenylenebis(dixylenyl phosphate), 1,4-phenylene bis(dixylenyl phosphate), 4,4'-biphenyl (dixylenyl phosphate), or the phosphorus-containing epoxy compounds are particularly preferred. The content of the phosphorus-containing compound (phosphorus-containing compound)/(total epoxy resin) is preferably within a range of 0.1 to 0.6 (weight ratio). When the content is 0.1 or less, the flame retardancy is insufficient. When the content is 0.6 or more, the hygroscopicity and dielectric properties of the cured product may be adversely affected.

A light stabilizer may be added to the curable resin composition of the present invention if necessary. As the light stabilizer, hindered amine-based light stabilizers, particularly HALS and the like are suitable. HALS is not particularly limited, and typical examples thereof include a polycondensate of dibutylamine 1,3,5-triazine-N,N-bis(2,2,6,6-tetramethyl-4-piperidyl-1,6-hexamethylenediamine and N-(2,2,6,6-tetramethyl-4-piperidyl) butylamine, a polycondensate of dimethyl-1-(2-hydroxyethyl)-4-hydroxy-2,2,6,6-tetramethylpiperidine succinate, poly[{6-(1,1,3,3-tetramethylbutyl) amino-1,3,5-triazine-2,4-diyl} {(2,2,6,6-tetramethyl-4-piperidyl) imino} hexamethylene {(2,2,6,6-tetramethyl-4-piperidyl) imino}], bis(1,2,2,6,6-pentamethyl-4-piperidyl)[[3,5-bis(1,1-dimethylethyl)-4-hydroxyphenyl] methyl] butyl malonate, bis(2,2,6,6-tetramethyl-4-piperidyl) sebacate, bis(1,2,2,6,6-pentamethyl-4-piperidyl) sebacate, bis(1-octyloxy-2,2,6,6-tetramethyl-4-piperidyl) sebacate, and 2-(3,5-di-t-butyl-4-hydroxybenzyl)-2-n-butylmalonate bis(1,2,2,6,6-pentamethyl-4-piperidyl). Only one kind of HALS may be used, or two or more kinds thereof may be used in combination.

The curable resin composition of the present invention may be blended with a binder resin as necessary. Examples of the binder resin include, but are not limited to, butyral resins, acetal resins, acrylic resins, epoxy-nylon resins, NBR-phenol resins, epoxy-NBR resins, polyamide resins, polyimide resins, and silicone resins. The blending amount of the binder resin is preferably in a range that does not impair the flame retardancy and heat resistance of the cured product, and is preferably 0.05 to 50 parts by mass, and more preferably 0.05 to 20 parts by mass based on 100 parts by mass of the resin component.

Further, inorganic fillers may be added to the curable resin composition of the present invention if necessary. Examples of the inorganic fillers include powders of fused silica, crystalline silica, porous silica, alumina, zircon, calcium silicate, calcium carbonate, quartz powder, silicon carbide, silicon nitride, boron nitride, zirconia, aluminum nitride, graphite, forsterite, steatite, spinel, mullite, titania, talc, clay, iron oxide asbestos, and glass powder, or the above fillers formed into a spherical shape or a crushed shape. In particular, when a curable resin composition for encapsulating a semiconductor is obtained, the usage amount of the inorganic filler is generally within a range of 80 to 92 mass %, preferably 83 to 90 mass %, in the curable resin composition.

The curable resin composition of the present invention may be blended with known additives if necessary. Specific examples of additives that can be used include surface treatment agents of fillers such as polybutadiene, modified products thereof, modified products of acrylonitrile copolymers, polyphenylene ether, polystyrene, polyethylene, polyimide, fluororesins, silicone gel, silicone oil and silane coupling agents, release agents, and colorants such as carbon black, phthalocyanine blue, and phthalocyanine green. The blending amount of these additives is preferably 1,000 parts by mass or less, and more preferably 700 parts by mass or less based on 100 parts by mass of the curable resin composition. From the viewpoint of low water absorption and electrical properties, polybutadiene and modified products thereof, polyphenylene ether, polystyrene, polyethylene, fluororesins, and the like are preferred. From the viewpoint of electrical properties, adhesion, and low water absorption, polybutadiene and modified products thereof are preferred. Specific examples thereof include butadiene-based thermoplastic elastomers such as a styrene-butadiene copolymer (SBR:RICON-100, RICON-181, RICON-184, all manufactured by Cray Valley) and an acrylonitrile butadiene copolymer; and styrene-based thermoplastic elastomers such as a styrene-butadiene-styrene copolymer (SBS), a hydrogenated styrene-butadiene-styrene copolymer, a styrene-isoprene-styrene copolymer (SIS), a hydrogenated styrene-isoprene-styrene copolymer, and a hydrogenated styrene-(butadiene/isoprene)-styrene copolymer. One of these styrene-based thermoplastic elastomers may be used alone, or two or more kinds thereof may be used in combination. Among these high molecular weight polymers, styrene-based thermoplastic elastomers such as a styrene-butadiene-styrene copolymer, a hydrogenated styrene-butadiene-styrene copolymer, a styrene-isoprene-styrene copolymer, a hydrogenated styrene-isoprene-styrene copolymer, and a hydrogenated styrene-(butadiene/isoprene)-styrene copolymer are preferred, and in particular, a styrene-isoprene-styrene copolymer, a hydrogenated styrene-butadiene-styrene copolymer, a hydrogenated styrene-isoprene-styrene copolymer, and a hydrogenated styrene-(butadiene/isoprene)-styrene copolymer are more preferred because they have higher heat resistance and are less likely to be oxidized and deteriorated. Specific examples thereof include SEPTON 1020, SEPTON 2002, SEPTON 2004F, SEPTON 2005, SEPTON 2006, SEPTON 2063, SEPTON 2104, SEPTON 4003, SEPTON 4044, SEPTON 4055, SEPTON 4077, SEPTON 4099, SEPTON 8004, SEPTON 8006, SEPTON 8007L, SEPTON HG252, SEPTON V9827, HYBRAR 7125 (hydrogenated), HYBRAR 7215F, and HYBRAR 7311F (all manufactured by Kuraray Co., Ltd.). In addition, the weight average molecular weight of the styrene-based thermoplastic elastomer is not particularly limited as long as it is 10,000 or more, but when it is too large, compatibility with a low molecular weight component having a weight average molecular weight of about 50 to 1,000 and an oligomer component having a weight average molecular weight of about 1,000 to 5,000 is deteriorated in addition to the polyphenylene ether compound, and it is difficult to ensure mixing and solvent stability. Therefore, the weight average molecular weight of the styrene-based thermoplastic elastomer is preferably about 10,000 to 300,000. In general, in the case of a compound, which contains a heteroatom such as oxygen or nitrogen, such as bismaleimide or polymaleimide, the polarity of the compound causes difficulty in ensuring compatibility with a low polarity compound such as a compound mainly composed of a hydrocarbon or a compound composed only of a hydrocarbon among the additives and the curable resin component. In contrast, the compound of the formula (1) itself is not a skeleton design in which a heteroatom such as oxygen or nitrogen is actively introduced, and therefore, the compound of the formula (1) is excellent in compatibility with a material having low polarity and low dielectric properties or a compound composed only of a hydrocarbon.

The curable resin composition of the present invention is obtained by uniformly mixing the above components at a predetermined ratio, and is preliminarily cured generally at 130 to 180° C. within a range of 30 to 500 seconds, and further post-cured at 150 to 200° C. for 2 to 15 hours, and whereby a curing reaction sufficiently proceeds, and the cured product of the present invention is obtained. It is also possible to perform the curing after the components of the curable resin composition are uniformly dispersed or dissolved in a solvent or the like, and the solvent is removed.

The thus-obtained curable resin composition of the present invention has moisture resistance, heat resistance, and high adhesiveness. Therefore, the curable resin composition of the present invention can be used in a wide range of fields requiring moisture resistance, heat resistance, and high adhesiveness. Specifically, the curable resin composition is useful as a material for various electric and electronic components, such as an insulating material, a laminated board (a printed wiring board, a BGA substrate, a build-up substrate, or the like), a sealing material, and a resist. In addition to the molding material and the composite material, the composition can also be used in the fields of coating materials, adhesives, 3D printing, and the like. In particular, solder reflow resistance is beneficial in semiconductor sealing.

A semiconductor device is sealed with the curable resin composition of the present invention. Examples of the semiconductor device include a dual in-line package (DIP), a quad flat package (QFP), a ball grid array (BGA), a chip size package (CSP), a small outline package (SOP), a thin small outline package (TSOP), and a thin quad flat package (TQFP).

The method for preparing the curable resin composition of the present invention is not particularly limited. The respective components may be mixed uniformly or prepolymerized. For example, the curable resin of the present invention is prepolymerized by being heated in the presence or absence of a catalyst or in the presence or absence of a solvent. Similarly, in addition to the curable resin of the present invention, a curing agent such as an epoxy resin, an amine compound, a maleimide-based compound, a cyanate ester compound, a phenol resin, and an acid anhydride compound, and other additives may be added to prepolymerize the resin. Mixing or prepolymerization of the respective components is performed using, for example, an extruder, a kneader, a roll, or the like in the absence of a solvent, and using, for example, a reaction vessel equipped with a stirrer in the presence of a solvent.

As a method of uniformly mixing, the components are kneaded and mixed at a temperature within a range of 50 to 100° C. using an apparatus such as a kneader, a roll, or a planetary mixer to obtain a uniform resin composition. The obtained resin composition is pulverized and then molded into a cylindrical tablet shape by a molding machine such as a tablet machine, or into a granular powder or powder molded body, or these compositions are melted on a surface support and molded into a sheet shape having a thickness of 0.05 mm to 10 mm, thereby obtaining a curable resin composition molded body. The obtained molded body becomes a molded body having no stickiness at 0 to 20° C., and the fluidity and the curability are hardly reduced even when the molded body is stored at −25 to 0° C. for one week or more. The obtained molded body can be molded into a cured product by a transfer molding machine or a compression molding machine.

A varnish-like composition (hereinafter, simply referred to as varnish) can be obtained by adding an organic solvent to the curable resin composition of the present invention. If necessary, the curable resin composition of the present invention is dissolved in a solvent such as toluene, xylene, acetone, methyl ethyl ketone, methyl isobutyl ketone, dimethylformamide, dimethylacetamide, and N-methylpyrrolidone to form a varnish, and a base material such as glass fibers, carbon fibers, polyester fibers, polyamide fibers, alumina fibers, and paper is impregnated with the varnish, followed by heating and drying to obtain a prepreg. The prepreg is subjected to hot press molding, so that a cured product of the curable resin composition of the present invention can be obtained. In this case, the solvent is used in an amount of generally 10 to 70 wt %, preferably 15 to 70 wt % in the mixture of the curable resin composition of the present invention and the solvent. In the case of a liquid composition, for example, a curable resin cured product containing carbon fibers can be obtained as it is by the RTM method.

The curable resin composition of the present invention can also be used as a modifier for a film-type composition. Specifically, the curable composition can be used to improve flexibility or the like in the B-stage. Such a film-type resin composition is obtained as a sheet-shaped adhesive by applying the curable resin composition of the present invention as the curable resin composition varnish onto a release film, removing the solvent under heating, and then performing B-stage formation. This sheet-shaped adhesive can be used as an interlayer insulating layer in a multilayer substrate or the like.

A prepreg can be obtained by heating and melting the curable resin composition of the present invention, reducing the viscosity of the composition, and impregnating reinforcing fibers such as glass fibers, carbon fibers, polyester fibers, polyamide fibers, and alumina fibers with the composition. Specific examples thereof include, but are not particularly limited to, glass fibers such as E glass cloth, D glass cloth, S glass cloth, Q glass cloth, spherical glass cloth, NE glass cloth, and T glass cloth; inorganic fibers other than glass; polyparaphenylene terephthalamide (Kevlar (registered trademark), manufactured by DuPont), wholly aromatic polyamide, and polyesters; and organic fibers such as polyparaphenylene benzoxazole, polyimide, and carbon fibers. The shape of the substrate is not particularly limited, and examples of the substrate include a woven fabric, a nonwoven fabric, roving, and a chopped strand mat. In addition, as a weaving method of the woven fabric, plain weave, mat weave, twill weave, and the like are known, and these known weaving methods can be appropriately selected and used depending on the intended use and performance. In addition, a woven fabric that has been subjected to an opening treatment or a glass woven fabric that has been subjected to a surface treatment with a silane coupling agent or the like is preferably used. The thickness of the substrate is not particularly limited, and is preferably about 0.01 to 0.4 mm. The above prepreg can also be obtained by impregnating reinforcing fibers with the varnish and performing heating and drying.

The laminated board of the present embodiment includes one or more of the prepregs. The laminated board is not particularly limited as long as it includes one or more prepregs, and may include any other layer. A method for manufacturing the laminated board is not particularly limited, and a generally known method can be appropriately applied. For example, a multistage pressing machine, a multistage vacuum pressing machine, a continuous molding machine, an autoclave molding machine, or the like can be used at the time of molding a metal foil-clad laminate, and the above prepregs are laminated and subjected to heat and pressure molding, so that a laminated board can be obtained. At this time, the heating temperature is not particularly limited, and is preferably 65 to 300° C., and more preferably 120 to 270° C. The pressure to be applied is not particularly limited, and is preferably 2.0 to 5.0 MPa, and more preferably 2.5 to 4.0 MPa since if the pressure is too high, it is difficult to adjust the solid content of the resin of the laminated board and the quality is not stable, and if the pressure is too low, the air bubbles occur and the adhesion between the laminates deteriorates. The laminated board of the present embodiment can be suitably used as a metal foil-clad laminated board to be described later by including a layer made of a metal foil.

The prepreg is cut into a desired shape and laminated with a copper foil or the like as necessary, and then the curable resin composition is heated and cured while applying pressure to the laminate by a press molding method, an autoclave molding method, a sheet winding molding method, or the like, so that a laminated board for an electric and electronic device (printed wiring board) or a carbon fiber reinforced material can be obtained.

The cured product of the present invention can be used in various applications such as a molding material, an adhesive, a composite material, and a coating material. Since the cured product of the curable resin composition according to the present invention exhibits excellent heat resistance and dielectric properties, the cured product is suitably used for an electrical and electronic component such as a sealing material for a semiconductor element, a sealing material for a liquid crystal display element, a sealing material for an organic EL device, a printed wiring substrate or a build-up laminated board, or a composite material for a lightweight high-strength structural material such as a carbon fiber reinforced plastic or a glass fiber reinforced plastic.

EXAMPLES

Next, the present invention will be described in more detail with reference to Examples. Hereinafter, "part (s)" is "part (s) by mass" unless otherwise specified. The present invention is not limited to these Examples.

Various analysis methods used in Examples will be described below.

<Weight Average Molecular Weight (Mw), and Number Average Molecular Weight (Mn)>

The Mw and Mn were calculated in terms of polystyrene using a polystyrene standard solution.

GPC: DGU-20A3R, LC-20AD, SIL-20AHT, RID-20A, SPD-20A, CTO-20A, CBM-20A (all manufactured by Shimadzu Corporation)

Column: Shodex KF-603, KF-602x2, KF-601x2

Linkage eluent: tetrahydrofuran

Flow rate: 0.5 ml/min

Column temperature: 40° C.

Detection: RI (differential refractometer)

Example 1

Figure 2:
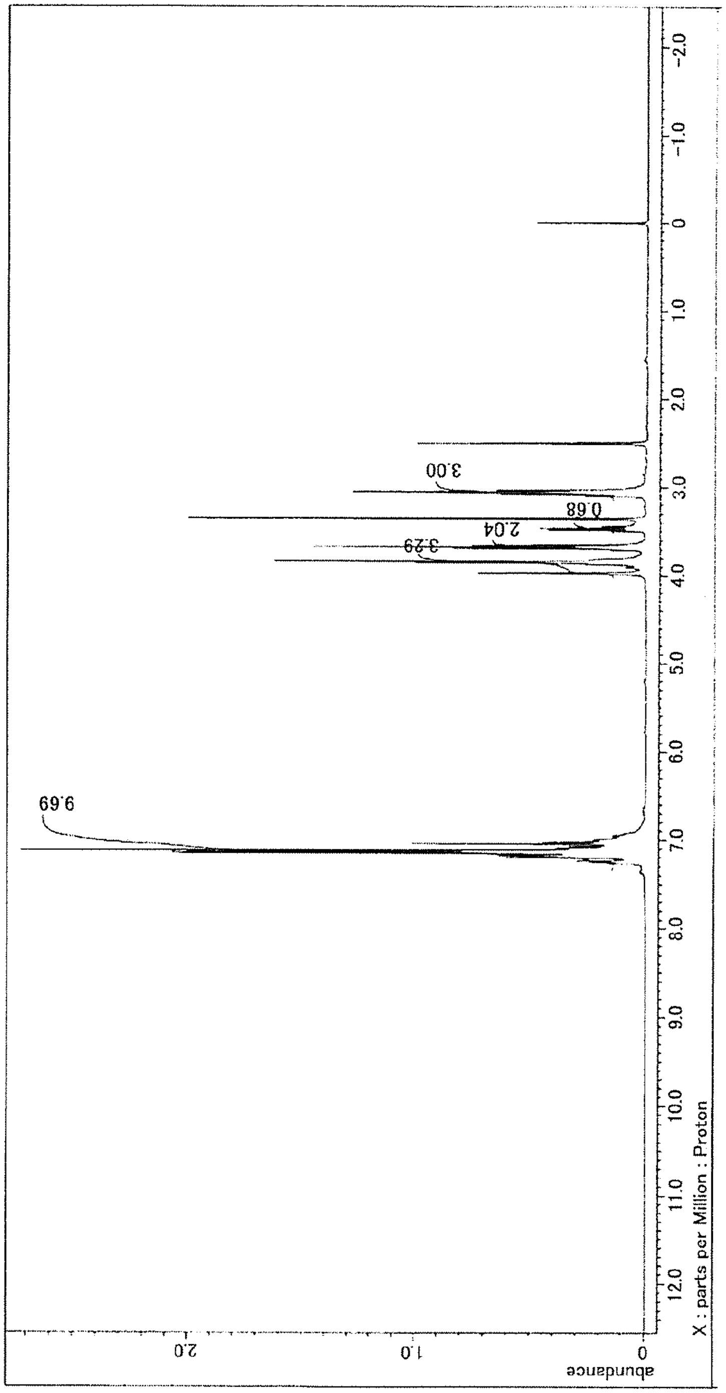
FIG. 2 is a $^1$H-NMR chart of Example 1.

Into a flask equipped with a thermometer, a cooling tube, and a stirrer, 296 parts of 2-bromoethylbenzene (manufactured by Tokyo Chemical Industry Co., Ltd.), 70 parts of α,α'-dichloro-p-xylene (manufactured by Tokyo Chemical Industry Co., Ltd.), and 18.4 parts of methanesulfonic acid (manufactured by Tokyo Chemical Industry Co., Ltd.) were charged, and the mixture was allowed to react at 130° C. for 8 hours. After cooling, the thus-obtained product was neutralized with a sodium hydroxide aqueous solution, extracted with 1200 parts of toluene, and the organic layer was washed five times with 100 parts of water. The solvent and excess 2-bromoethylbenzene were distilled off under heating and reduced pressure to obtain, as a liquid resin, 160 parts of a compound precursor (BEB-1) having a 2-bromoethylbenzene structure (Mn: 538, Mw: 649). The reaction formula is shown in the following paragraph. The GPC chart of the obtained compound is shown in FIG. 1. The number n of the repeating units calculated based on the area % in the GPC chart was 1.7. A $^{1}$H-NMR chart (DMSO-d6) of the obtained compound is shown in FIG. 2. Bromoethyl group-derived signals were observed at 2.95 to 3.15 ppm and 3.60 to 3.75 ppm in the $^{1}$H-NMR chart.

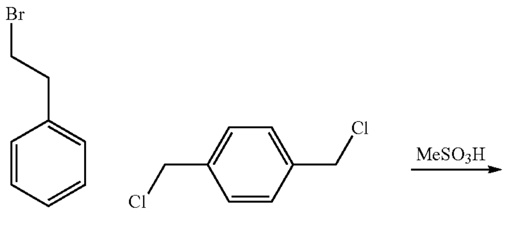

-continued

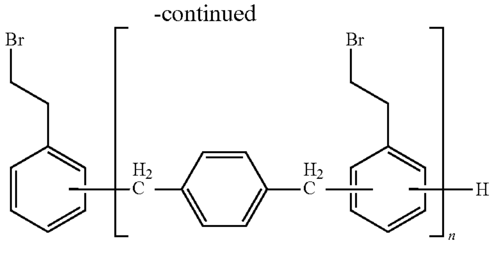

Example 2

Figure 3:
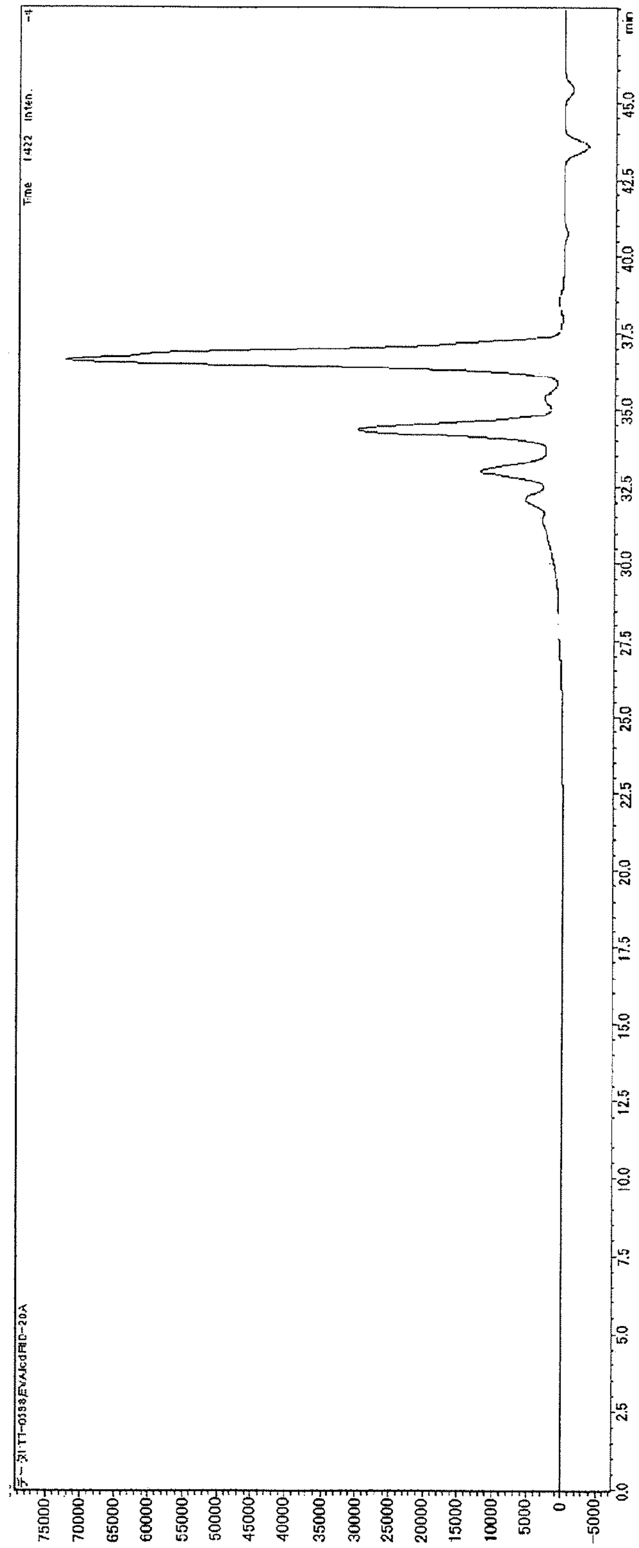
FIG. 3 is a GPC chart of Example 2.
Figure 4:
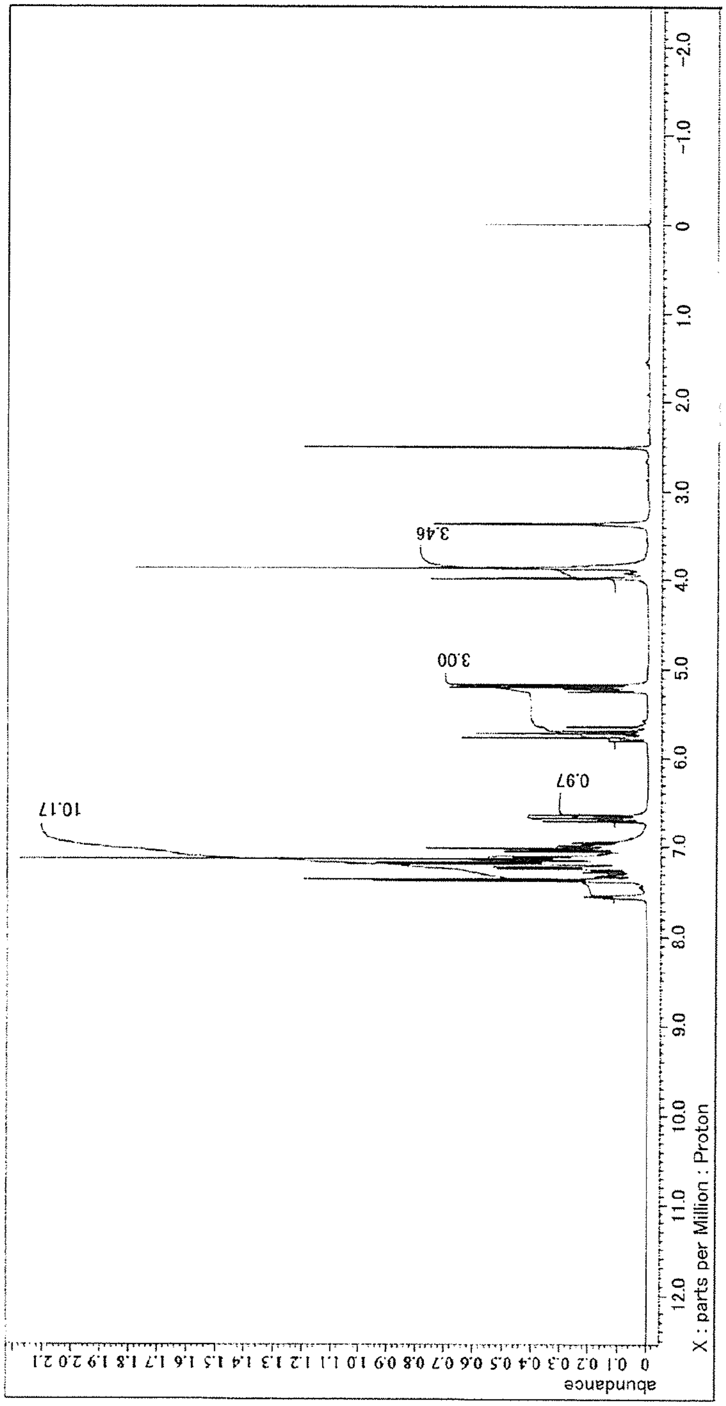
FIG. 4 is a $^1$H-NMR chart of Example 2.

Into a flask equipped with a thermometer, a cooling tube, and a stirrer, 22 parts of BEB-1 obtained in Example 1, 50 parts of toluene, 150 parts of dimethyl sulfoxide, 15 parts of water, and 5.4 parts of sodium hydroxide were added, and the mixture was allowed to react at 40° C. for 5 hours. After cooling, 100 parts of toluene was added thereto, the organic layer was washed five times with 100 parts of water, and the solvent was distilled off under heating and reduced pressure to obtain 13 parts of a liquid compound (O-1) having a styrene structure as a functional group (Mn: 432, Mw: 575). The reaction formula is shown in the following paragraph. A GPC chart of the obtained compound is shown in FIG. 3. The number n of the repeating units calculated based on the area % in the GPC chart was 1.7. In addition, the $^1$H-NMR data (DMSO-d6) of the obtained compound is shown in FIG. 4. Vinyl group-derived signals were observed at 5.10 to 5.30 ppm, 5.50 to 5.85 ppm, and 6.60 to 6.80 ppm in the NMR chart.

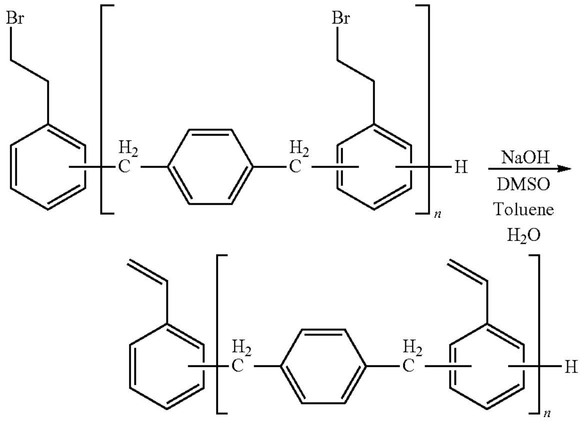

Example 3

Figure 5:
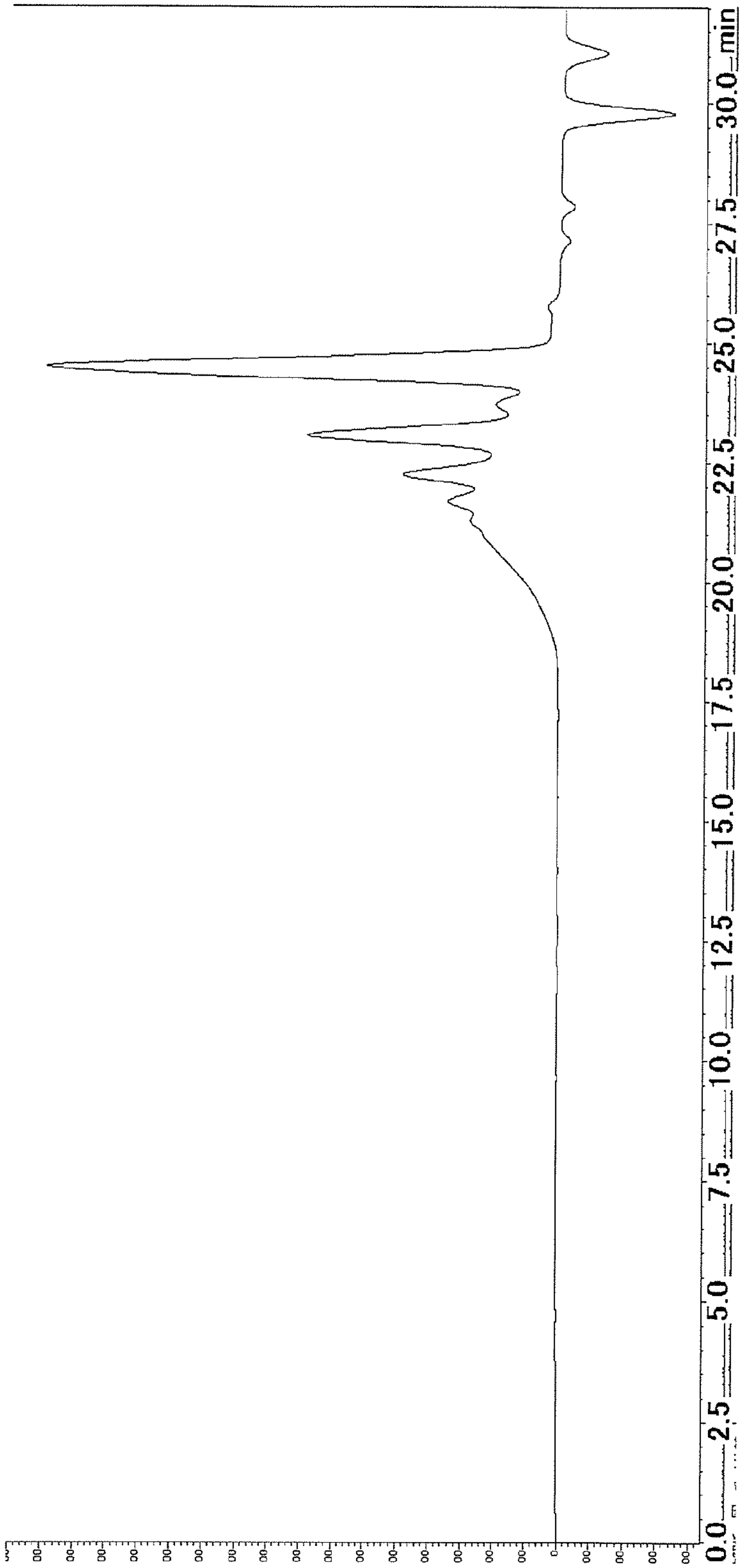
FIG. 5 is a GPC chart of Example 3.
Figure 6:
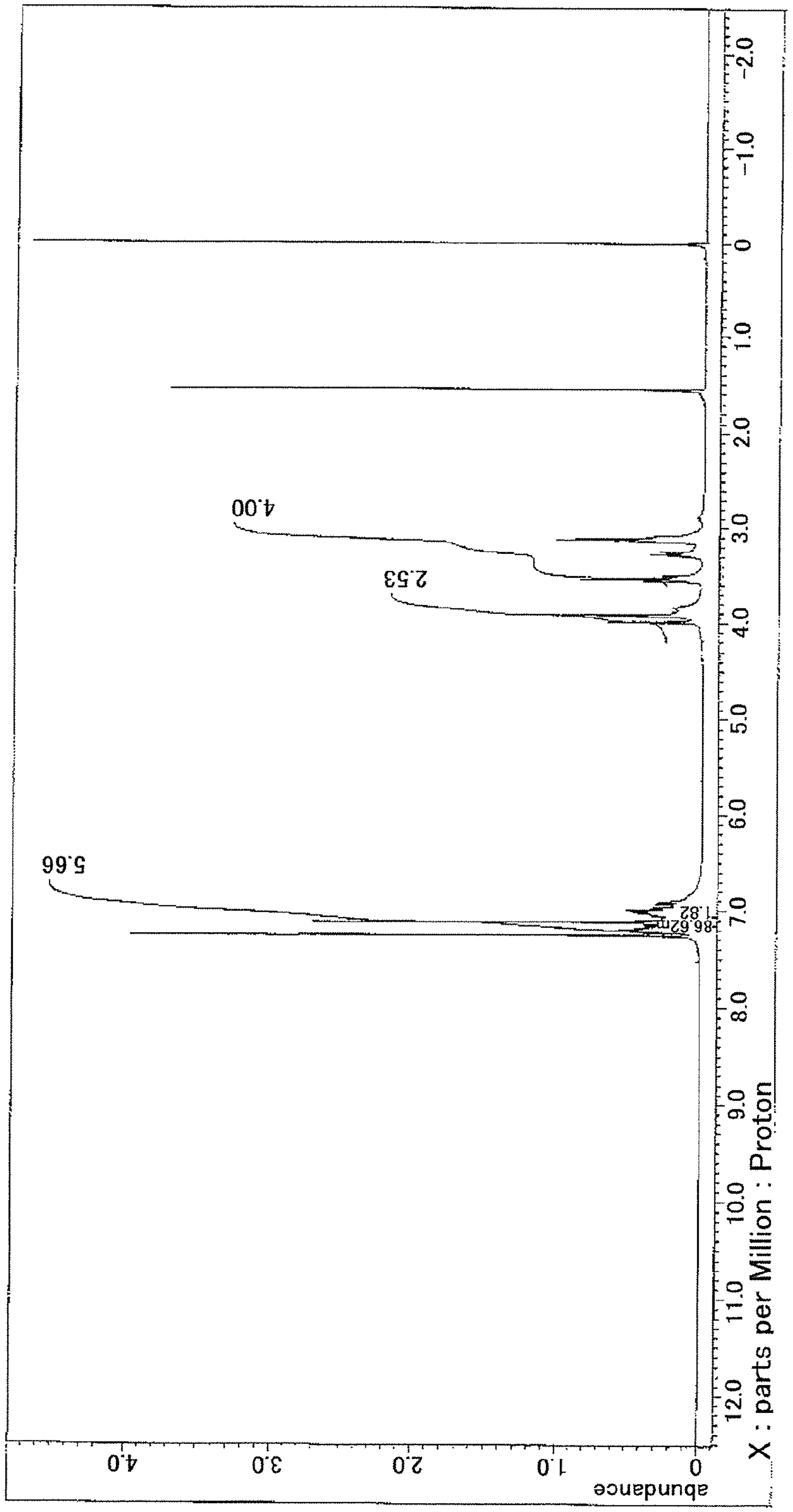
FIG. 6 is a $^1$H-NMR chart of Example 3.

Into a flask equipped with a thermometer, a cooling tube, and a stirrer, 55.5 parts of 2-bromoethylbenzene (manufactured by Tokyo Chemical Industry Co., Ltd.), 17.5 parts of α,α'-dichloro-m-xylene (manufactured by Tokyo Chemical Industry Co., Ltd.), and 3.7 parts of methanesulfonic acid (manufactured by Tokyo Chemical Industry Co., Ltd.) were charged, and the mixture was allowed to react at 130° C. for 13 hours and then at 150° C. for 5 hours. After cooling, 26.6 parts of toluene and 80 parts of cyclohexane were added, and the organic layer was washed five times with 100 parts of water. The solvent and excess 2-bromoethylbenzene were distilled off under heating and reduced pressure to obtain, as a liquid resin, 38.3 parts of a compound precursor (BEB-2) having a 2-bromoethylbenzene structure (Mn: 406, Mw: 670). The reaction formula is shown in the following paragraph. A GPC chart of the obtained compound is shown in FIG. 5. The number n of the repeating units calculated based on the area % in the GPC chart was 2.6. In addition, a $^1$H-NMR chart (deuterated chloroform) of the obtained compound is shown in FIG. 6. Bromoethyl group-derived signals were observed at 2.95 to 3.15 ppm and 3.45 to 3.60 ppm in the $^1$H-NMR chart.

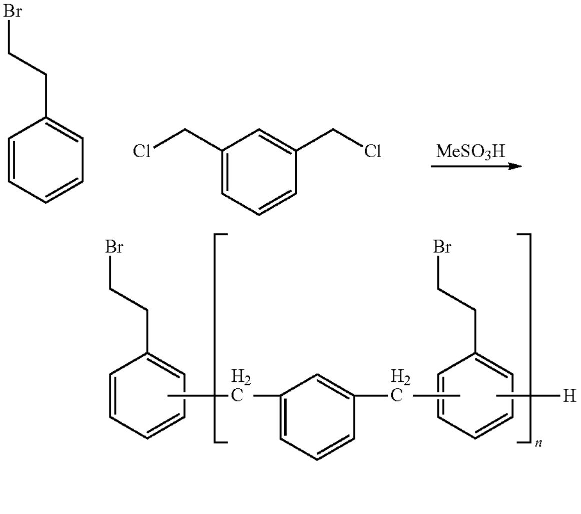

Example 4

Figure 7:
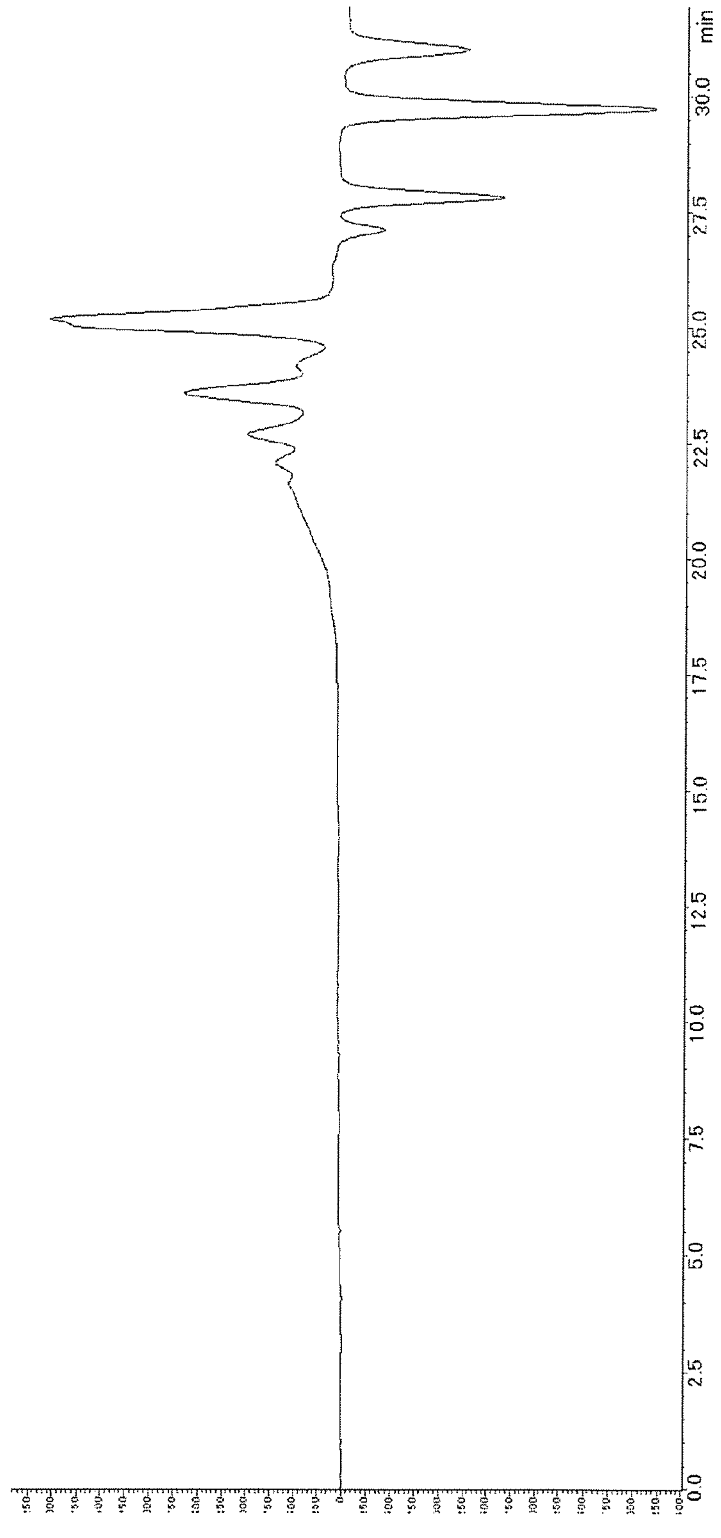
FIG. 7 is a GPC chart of Example 4.
Figure 8:
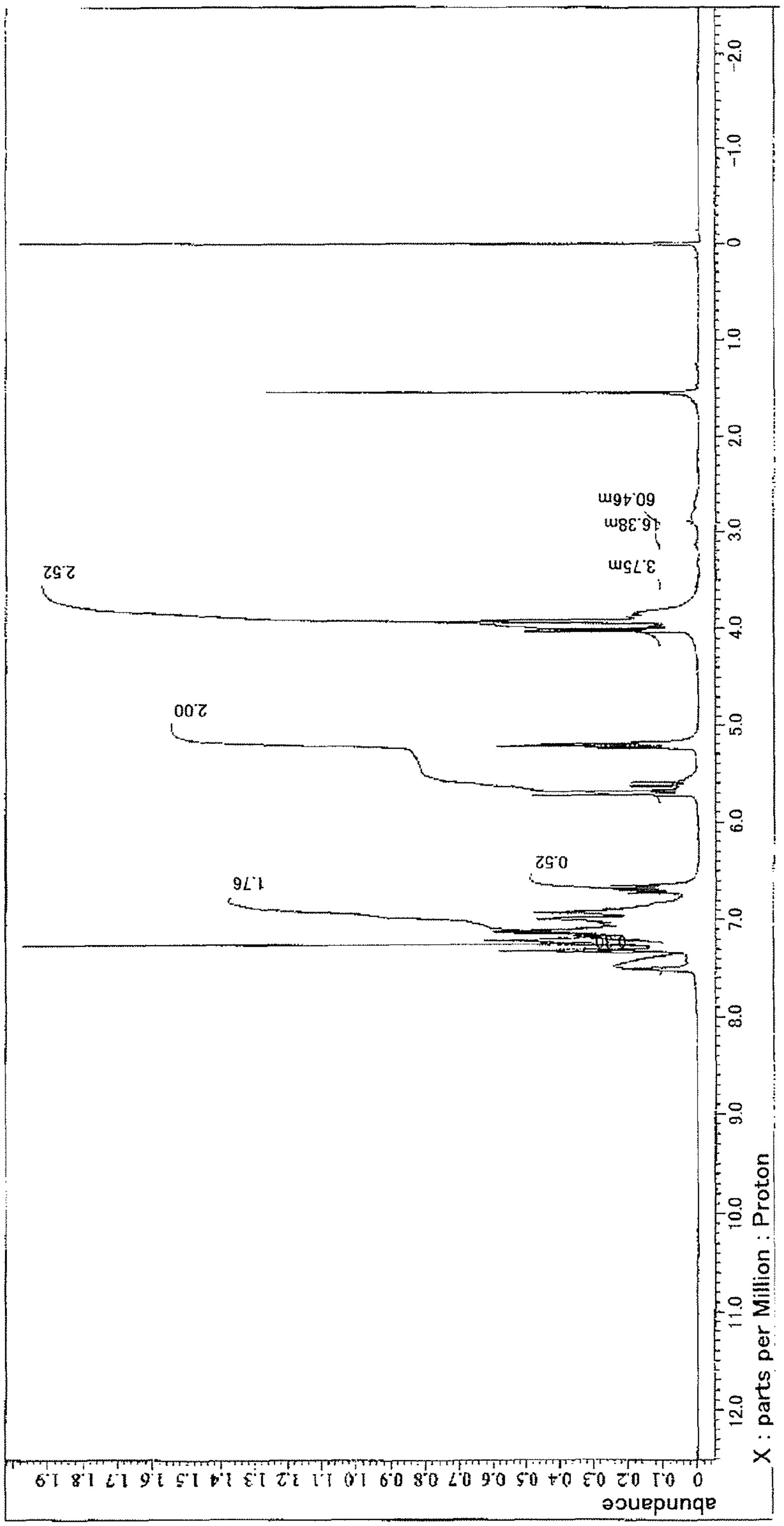
FIG. 8 is a $^1$H-NMR chart of Example 4.

To a flask equipped with a thermometer, a cooling tube, and a stirrer, 25.2 parts of BEB-2 obtained in Example 3, 20.6 parts of toluene, 61.7 parts of dimethyl sulfoxide, and 12 parts of a 50 wt % sodium hydroxide aqueous solution were added, and the mixture was allowed to react at 40° C. for 1 hour, and then at 50° C. for 2 hours. After cooling, 100 parts of toluene was added thereto, the organic layer was washed five times with 100 parts of water, and the solvent was distilled off under heating and reduced pressure to obtain 10 parts of a liquid compound (O-2) having a styrene structure as a functional group (Mn: 332, Mw: 562). The reaction formula is shown in the following paragraph. A GPC chart of the obtained compound is shown in FIG. 7. The number n of the repeating units calculated based on the area % in the GPC chart was 2.6. The $^1$H-NMR data (deuterated chloroform) of the obtained compound is shown in FIG. 8. Vinyl group-derived signals were observed at 5.10 to 5.30 ppm, 5.50 to 5.80 ppm, and 6.60 to 6.80 ppm in the $^1$H-NMR chart.

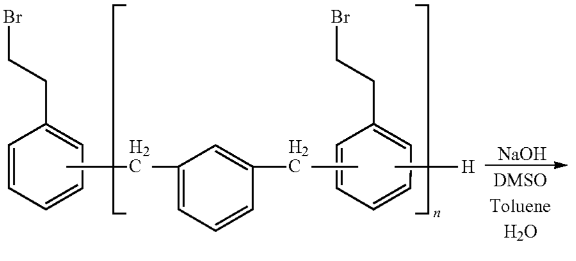

-continued

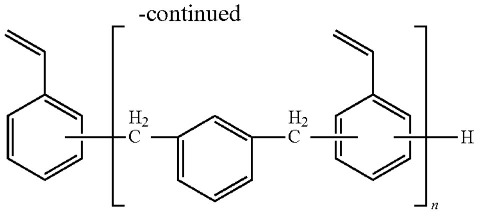

Example 5

Figure 9:
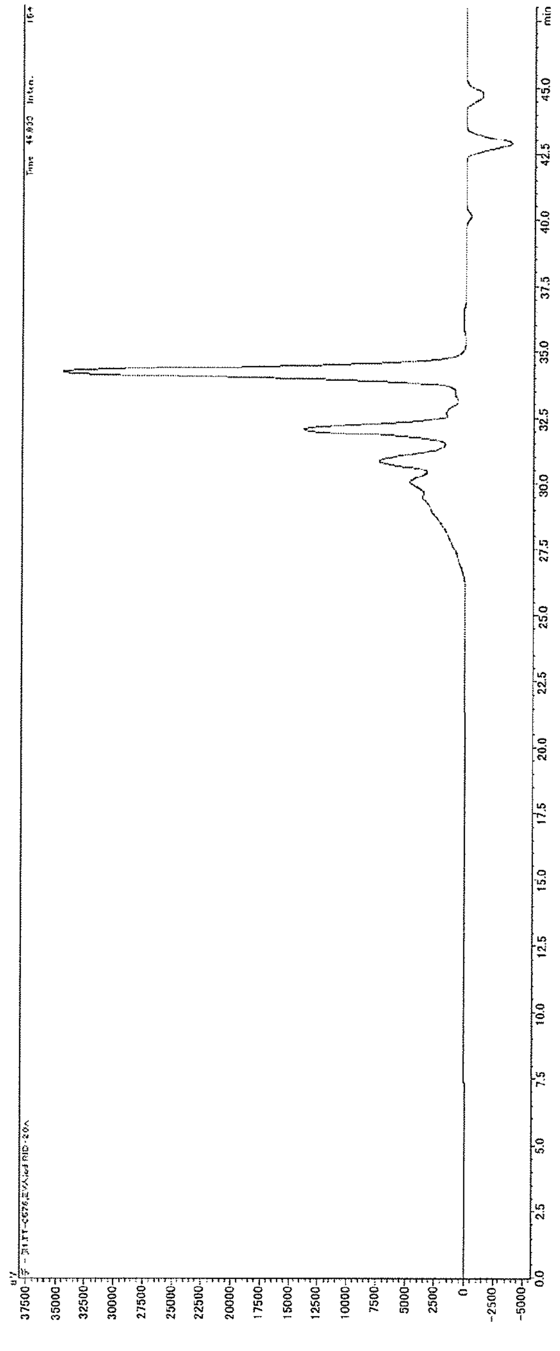
FIG. 9 is a GPC chart of Example 5.
Figure 10:
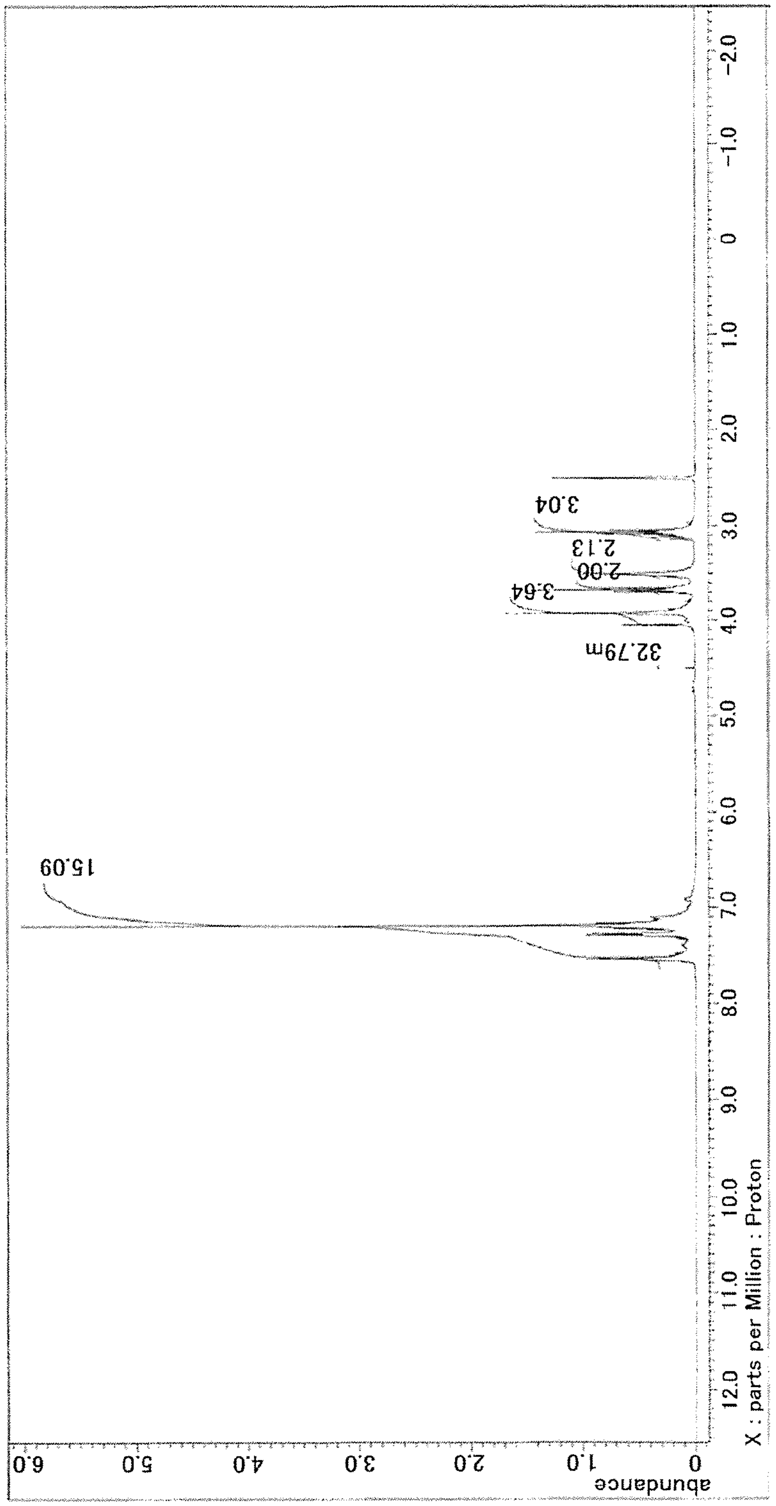
FIG. 10 is a $^1$H-NMR chart of Example 5.

Into a flask equipped with a thermometer, a cooling tube, and a stirrer, 74.0 parts of 2-bromoethylbenzene (manufactured by Tokyo Chemical Industry Co., Ltd.), 25.1 parts of 4,4'-bischloromethylenebiphenyl (manufactured by Tokyo Chemical Industry Co., Ltd.), and 5.0 parts of methanesulfonic acid (manufactured by Tokyo Chemical Industry Co., Ltd.) were charged, and the mixture was allowed to react at 110° C. for 3 hours. After cooling, the thus-obtained product was neutralized with a sodium hydroxide aqueous solution, extracted with 300 parts of toluene, and the organic layer was washed five times with 100 parts of water. The solvent and excess 2-bromoethylbenzene were distilled off under heating and reduced pressure to obtain, as a semi-solid resin, 35 parts of a compound precursor (BEB-3) having a 2-bromoethylbenzene structure (Mn: 883, Mw: 1284). The reaction formula is shown in the following paragraph. A GPC chart of the obtained compound is shown in FIG. 9. The number n of the repeating units calculated based on the area % in the GPC chart was 2.3. A $^{1}$H-NMR chart (DMSO-d6) of the obtained compound is shown in FIG. 10. Bromoethyl group-derived signals were observed at 2.90 to 3.20 ppm and 3.60 to 3.75 ppm in the $^{1}$H-NMR chart.

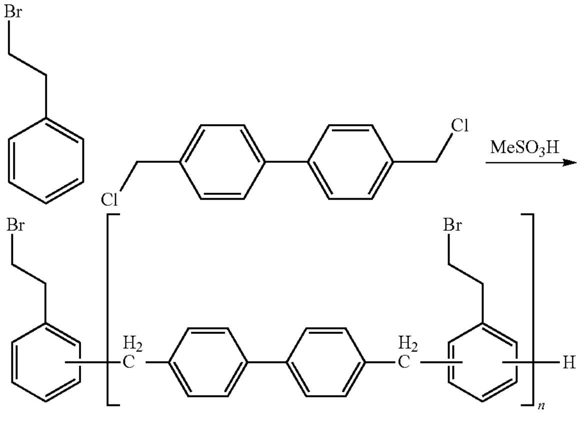

Example 6

Figure 11:
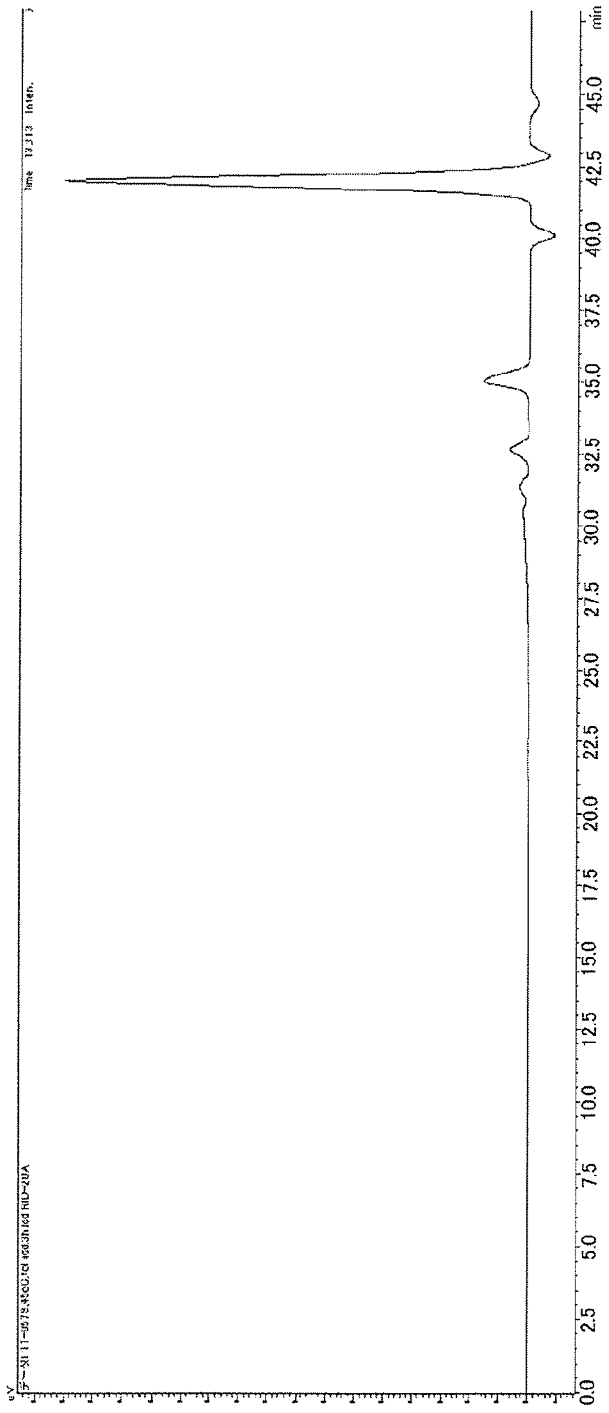
FIG. 11 is a GPC chart of Example 6.
Figure 12:
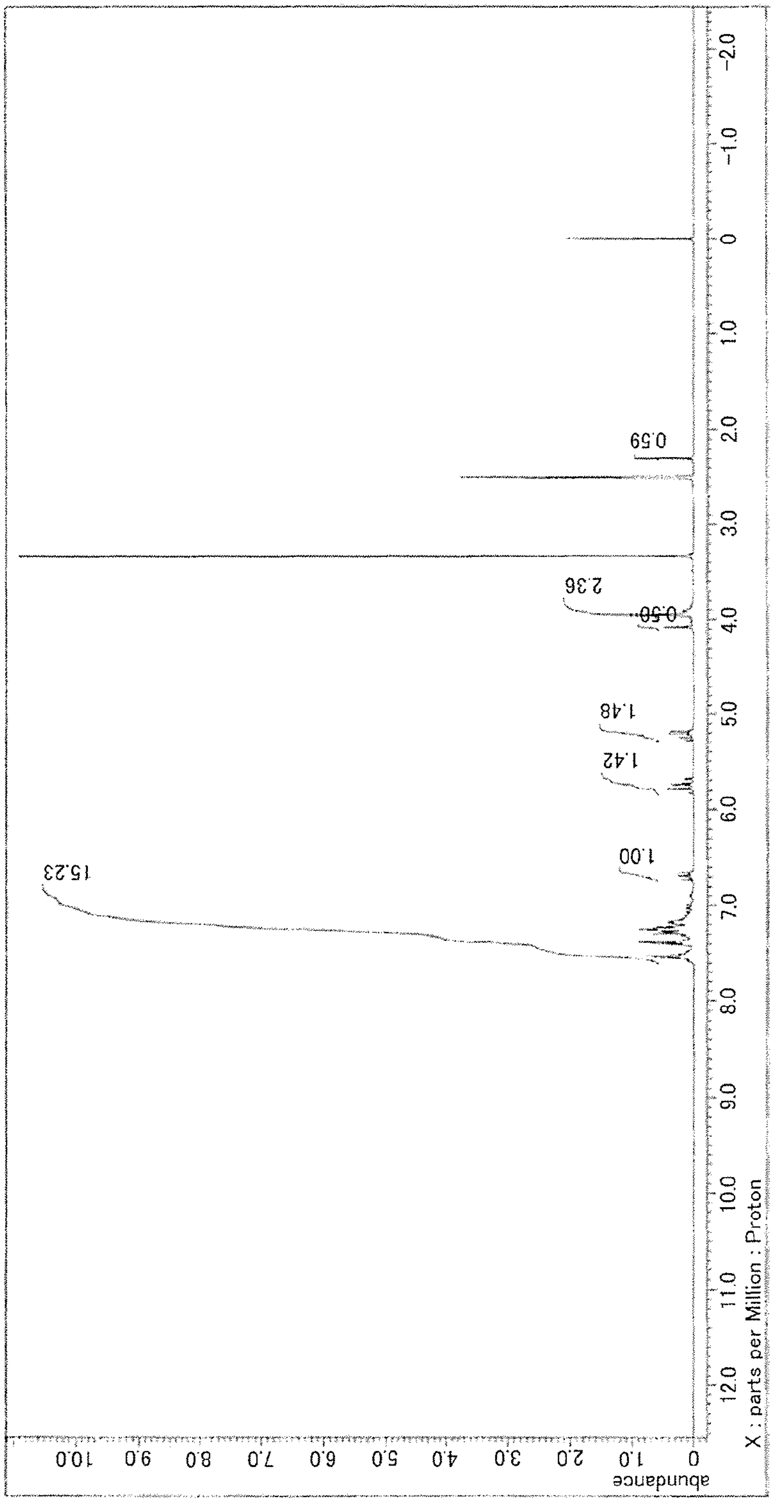
FIG. 12 is a $^1$H-NMR chart of Example 6.

To a flask equipped with a thermometer, a cooling tube, and a stirrer, 23.5 parts of BEB-3 obtained in Example 5, 50 parts of toluene, 150 parts of dimethyl sulfoxide, 10 parts of water, 4.74 parts of sodium hydroxide, and 0.012 parts of methyl hydroquinone were added, and the mixture was allowed to react at 45° C. for 3 hours. After cooling, 100 parts of toluene was added, the organic layer was washed five times with 100 parts of water, and the solvent was distilled off under heating and reduced pressure to obtain 16.5 parts of a semi-solid compound (O-3) having a styrene structure as a functional group (Mn: 736, Mw: 1235). The reaction formula is shown in the following paragraph. A GPC chart at the time of completion of the reaction is shown in FIG. 11. The number n of the repeating units calculated based on the area % in the GPC chart was 2.3. In addition, the reaction solution at the time of completion of the reaction was partially concentrated, and $^{1}$H-NMR of a toluene solution having an increased solid content concentration was obtained. The chart (DMSO-d6) is shown in FIG. 12. Vinyl group-derived signals were observed at 5.15 to 5.30 ppm, 5.65 to 5.85 ppm, and 6.60 to 6.80 ppm in the $^{1}$H-NMR chart.

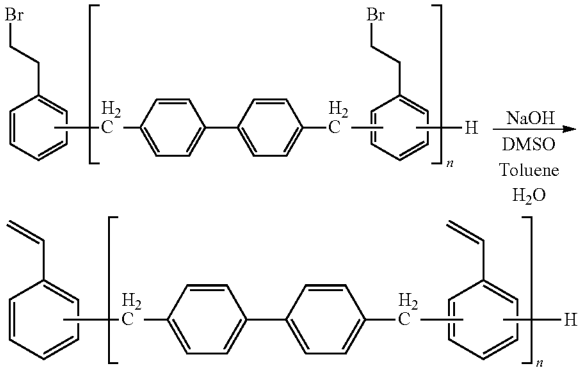

Example 7

Figure 13:
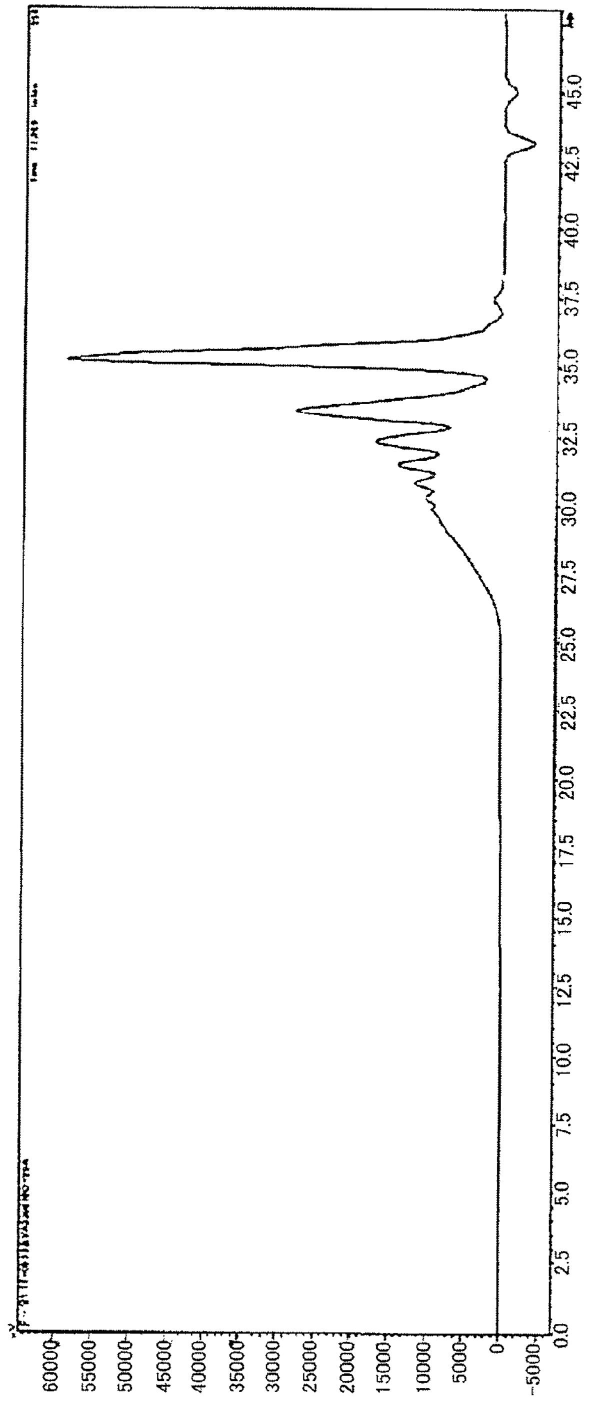
FIG. 13 is a GPC chart of Example 7.
Figure 14:
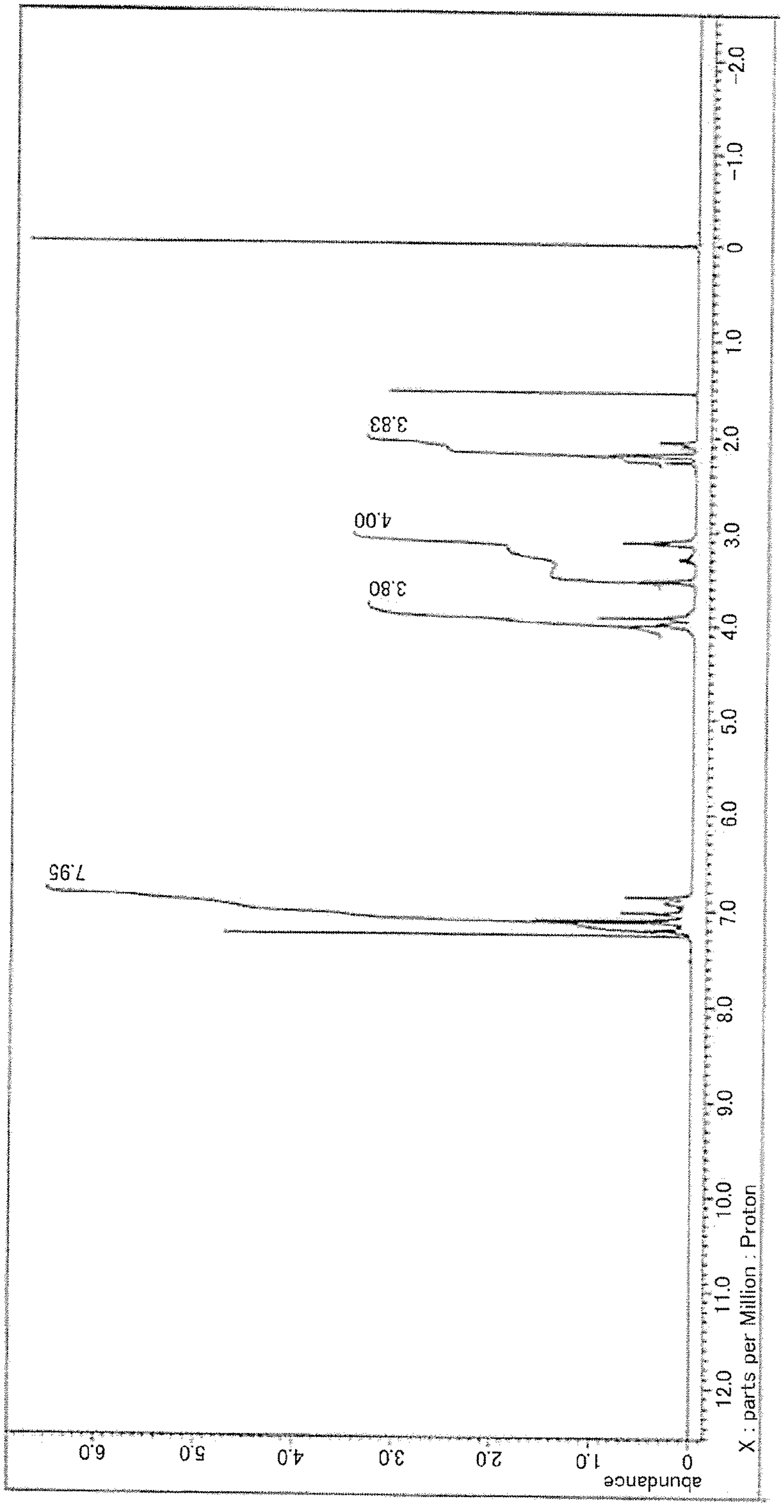
FIG. 14 is a $^1$H-NMR chart of Example 7.

Into a flask equipped with a thermometer, a cooling tube, and a stirrer, 55.5 parts of 2-bromoethylbenzene (manufactured by Tokyo Chemical Industry Co., Ltd.), 35.0 parts of α,α'-dichloro-p-xylene (manufactured by Tokyo Chemical Industry Co., Ltd.), 12.0 parts of mesitylene, and 5.1 parts of methanesulfonic acid (manufactured by Tokyo Chemical Industry Co., Ltd.) were charged, and the mixture was allowed to react at 130° C. for 5 hours. After cooling, extraction was performed with 200 parts of toluene, and the organic layer was washed five times with 100 parts of water. The solvent and excess 2-bromoethylbenzene were distilled off under heating and reduced pressure to obtain, as a semi-solid resin, 66.5 parts of a compound precursor (BEB-4) having a 2-bromoethylbenzene structure (Mn: 704, Mw: 1124). The reaction formula is shown in the following paragraph. A GPC chart of the obtained compound is shown in FIG. 13. A $^{1}$H-NMR chart (deuterated chloroform) of the obtained compound is shown in FIG. 14. Bromoethyl group-derived signals were observed at 3.05 to 3.60 ppm in the $^{1}$H-NMR chart.

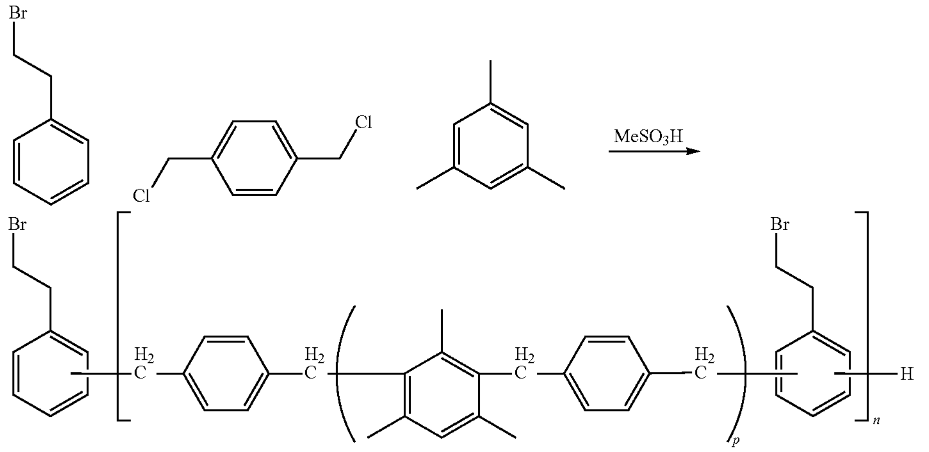

Example 8

Figure 15:
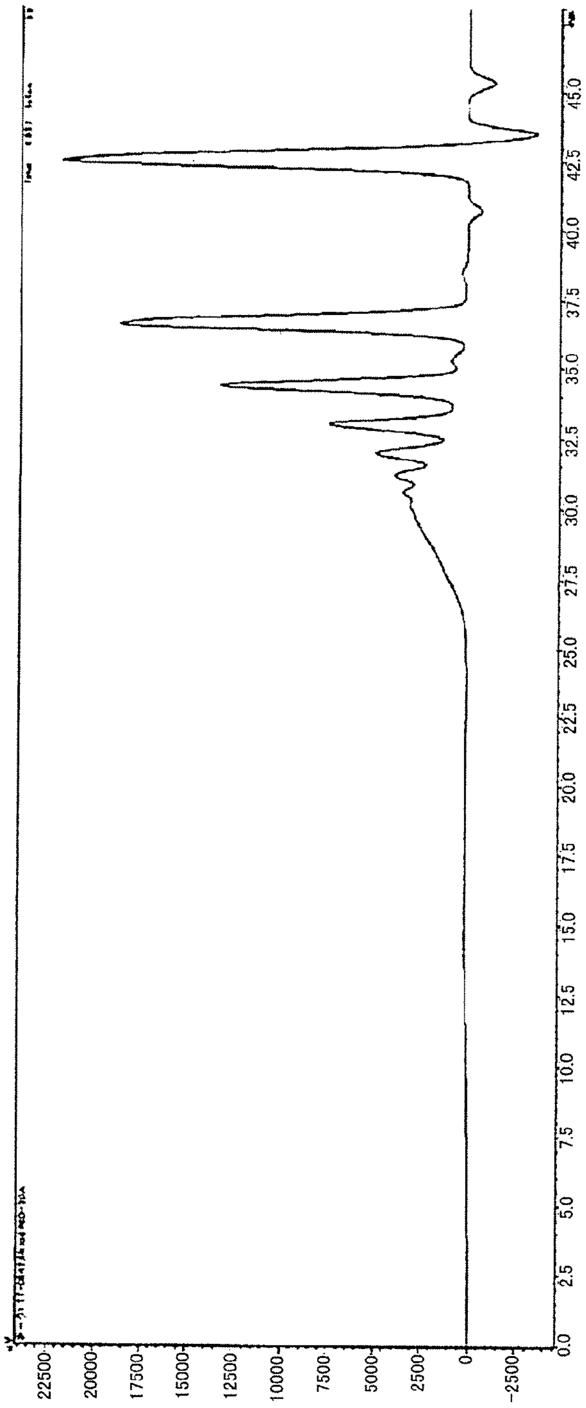
FIG. 15 is a GPC chart of Example 8.
Figure 16:
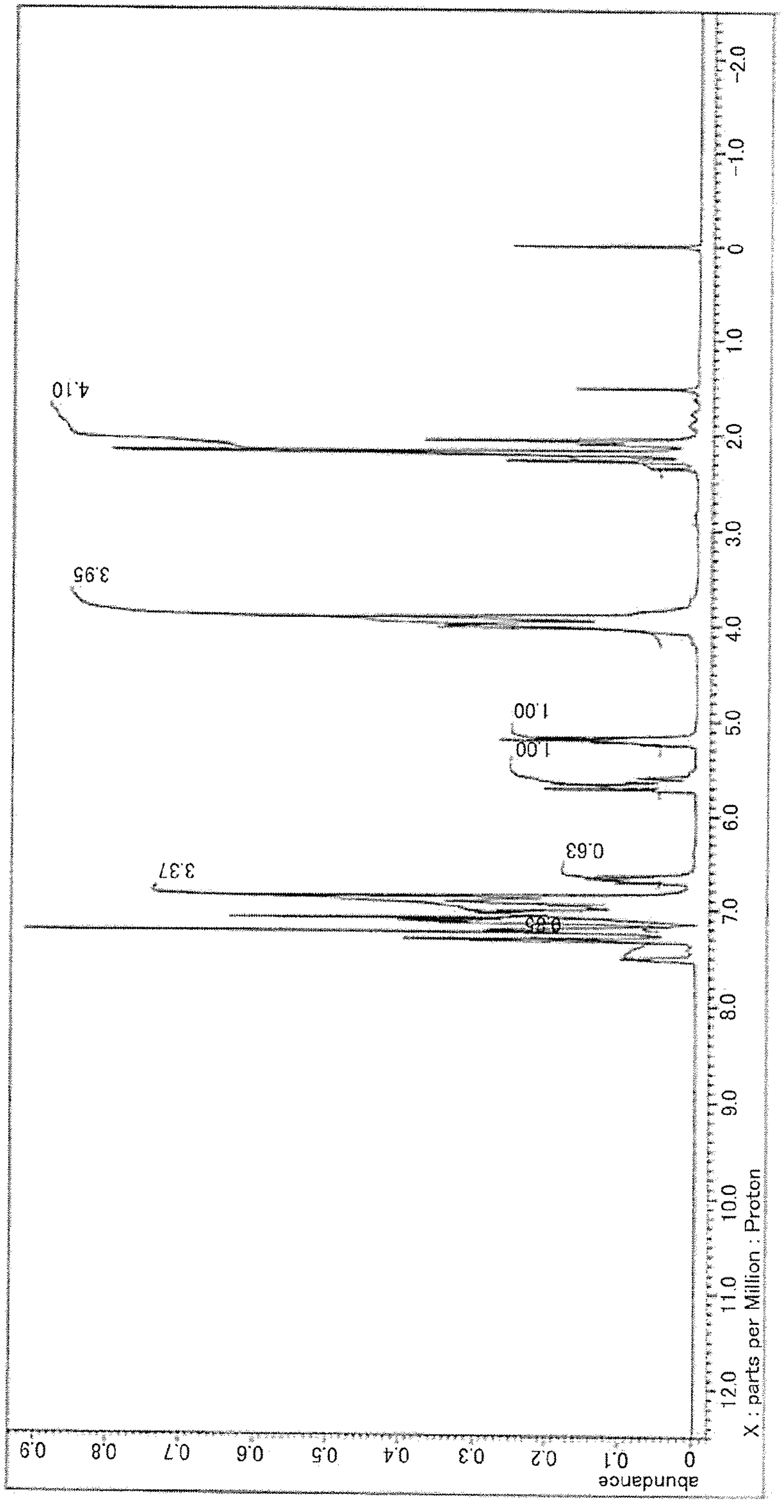
FIG. 16 is a $^1$H-NMR chart of Example 8.

To a flask equipped with a thermometer, a cooling tube, and a stirrer, 50 parts of BEB-4 obtained in Example 7, 25 parts of toluene, 75 parts of dimethyl sulfoxide, 7.5 parts of water, 0.025 parts of 4-hydroxy-2,2,6,6-tetramethylpiperidine-1-oxyl, and 13 parts of sodium hydroxide were added, and the mixture was allowed to react at 40° C. for 5 hours, and then reacted at 70° C. for 1 hour. After cooling, 100 parts of toluene was added thereto, the organic layer was washed five times with 100 parts of water, and the solvent was distilled off under heating and reduced pressure to obtain 31.5 parts of a high-viscosity liquid compound (O-4) having a styrene structure as a functional group (Mn: 602, Mw: 1054). The reaction formula is shown in the following paragraph. A GPC chart at the end of the reaction is shown in FIG. 15. The $^1$H-NMR data (deuterated chloroform) of the obtained compound is shown in FIG. 16. Vinyl group-derived signals were observed at 5.10 to 5.30 ppm, 5.50 to 5.85 ppm, and 6.60 to 6.80 ppm in the $^1$H-NMR chart.

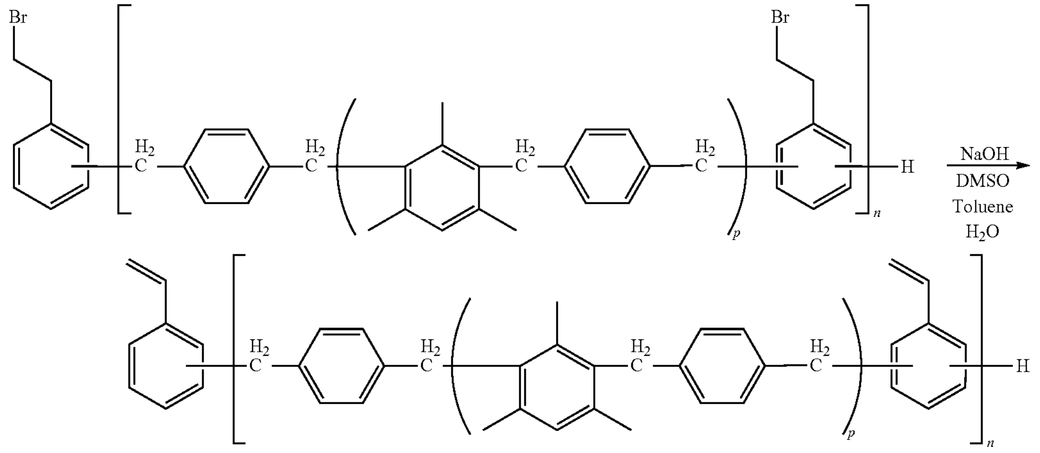

Example 9

Figure 17:
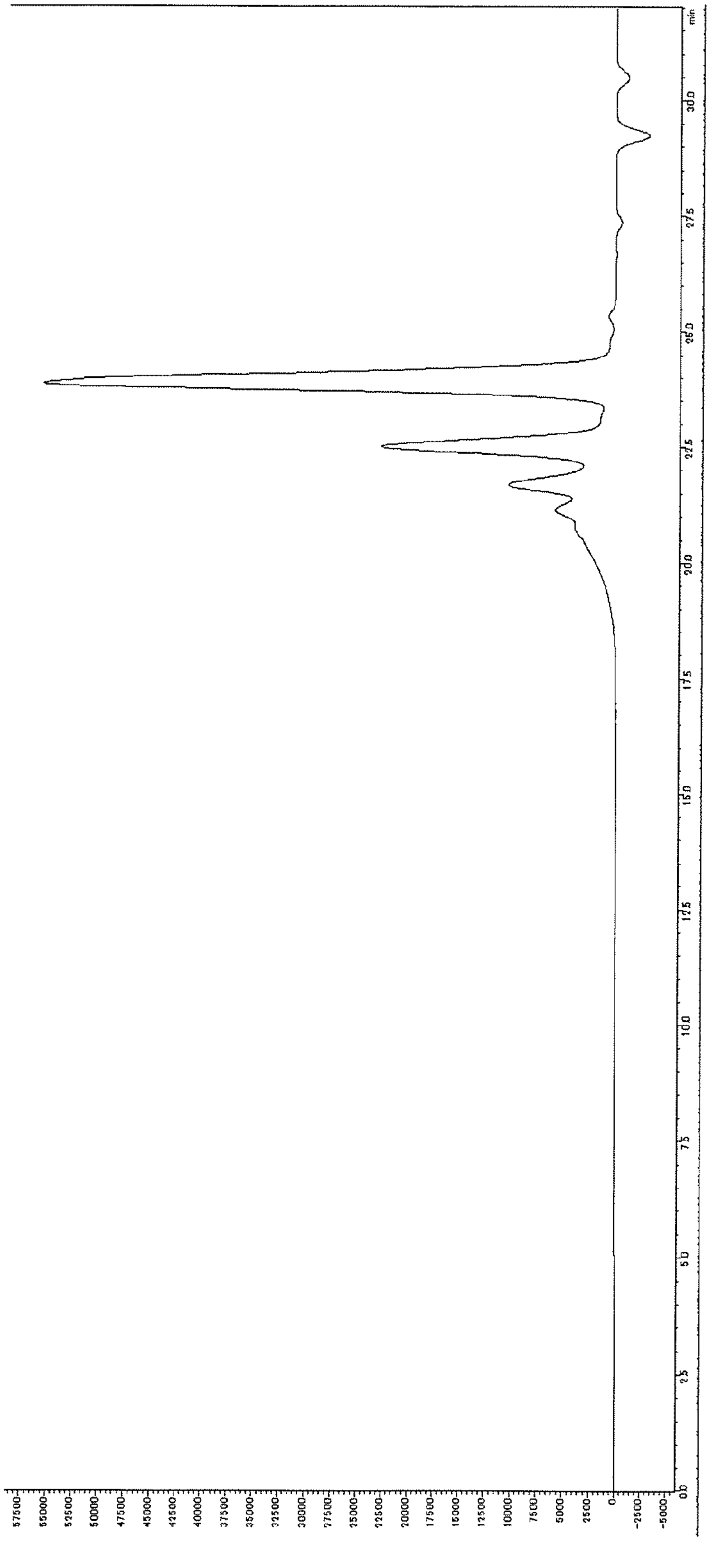
FIG. 17 is a GPC chart of Example 9.

An aspirator and a base trap were mounted on a flask equipped with a thermometer, a cooling tube, and a stirrer. Into this flask, 416.4 parts of 2-bromoethylbenzene (manufactured by Tokyo Chemical Industry Co., Ltd.), 131.3 parts of α,α'-dichloro-p-xylene (manufactured by Tokyo Chemical Industry Co., Ltd.), and 27.3 parts of methanesulfonic acid (manufactured by Tokyo Chemical Industry Co., Ltd.) were charged, followed by activating the aspirator, and the mixture was allowed to react at 130° C. for 6 hours while the generated hydrogen chloride was collected by the base trap. After cooling, 100 parts of toluene and 500 parts of cyclohexane were added thereto, extraction was performed, and the organic layer was washed five times with 100 parts of water. The solvent and excess 2-bromoethylbenzene were distilled off under heating and reduced pressure to obtain, as a liquid resin, 305 parts of a resin precursor (BEB-5) having a 2-bromoethylbenzene structure (Mn: 438, Mw: 641). The reaction formula is shown in the following paragraph. A GPC chart of the obtained compound is shown in FIG. 17. The number n of the repeating units calculated based on the area % in the GPC chart was 1.9.

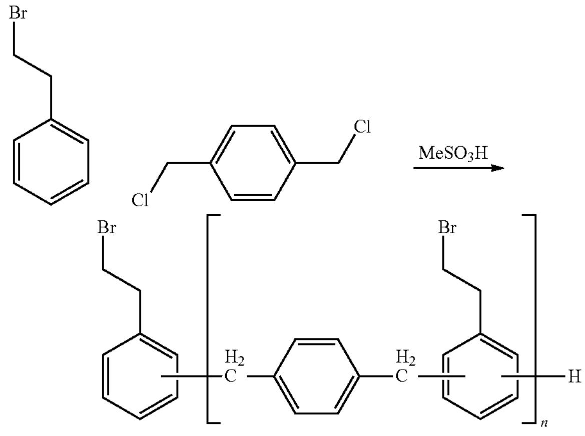

Example 10

Figure 18:
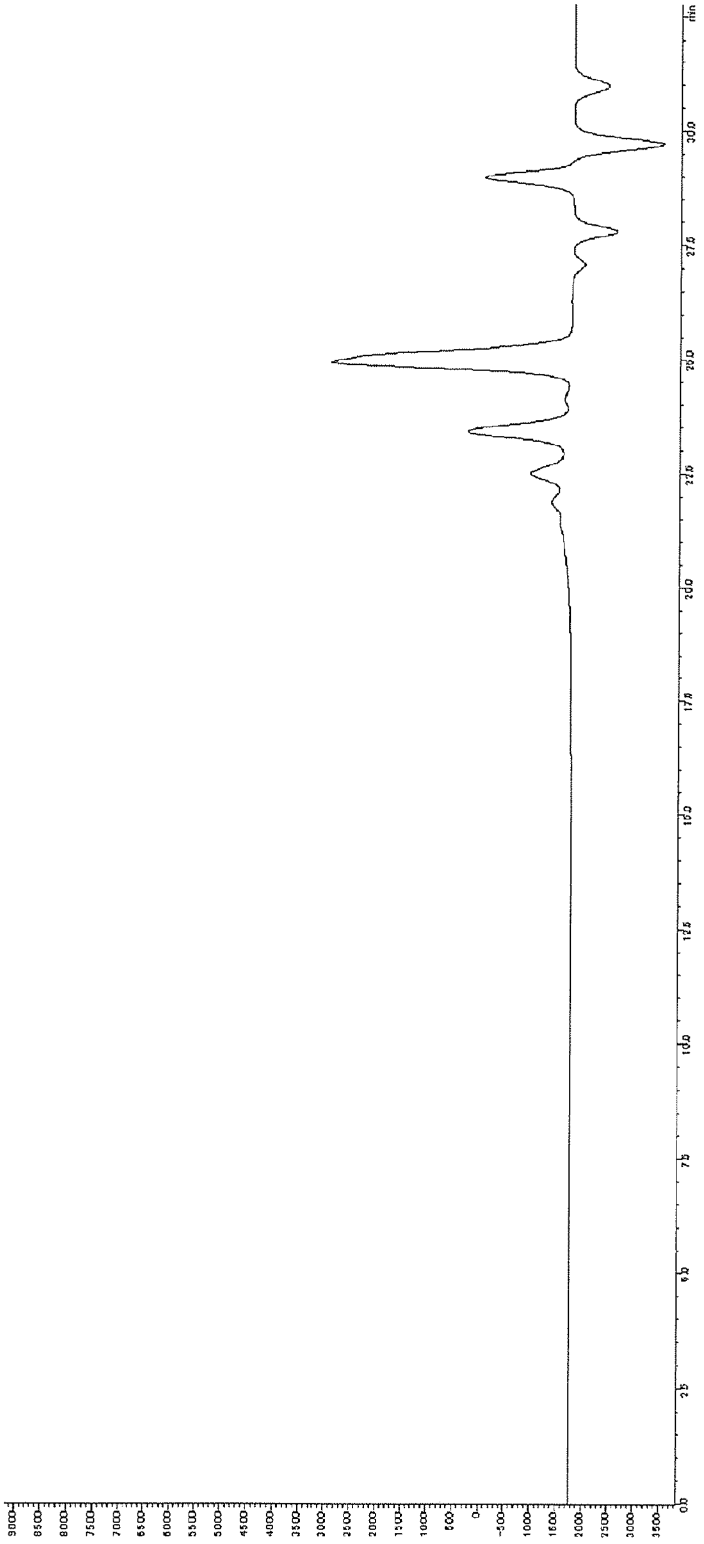
FIG. 18 is a GPC chart of Example 10.

To a flask equipped with a thermometer, a cooling tube, and a stirrer, 300 parts of BEB-5 obtained in Example 9, 245 parts of toluene, 735 parts of dimethyl sulfoxide, 0.15 parts of 4-hydroxy-2,2,6,6-tetramethylpiperidine-1-oxyl free radical, and 146.4 parts of a 50 wt % sodium hydroxide aqueous solution were added, and the reaction was lasted at 40° C. for 6 hours. After 100 parts of water was added and the organic layer was washed, the organic layer was returned to a reaction vessel. 735 parts of dimethyl sulfoxide and 9.8 parts of a 50 wt % sodium hydroxide aqueous solution were added, a reaction was performed again at 40° C. for 1 hour, followed by adding 300 parts of toluene, and the organic layer was repeatedly washed with 100 parts of water until the wastewater becomes neutral. Concentration was performed under reduced pressure using an evaporator to obtain 250 parts of a resin solution (OS-1) having a solid content of 60 wt %. The reaction formula is shown in the following paragraph. A GPC chart of the obtained resin solution is shown in FIG. 18. The number n of the repeating units calculated based on the area % in the GPC chart was 1.9 (the molecular weight of the resin component was Mn: 338 and Mw: 437).

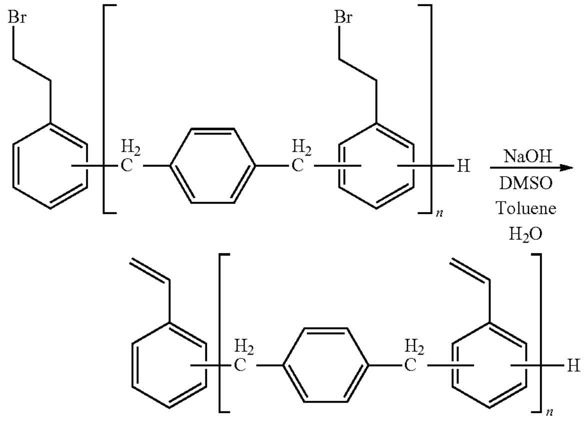

Examples 11 to 15 and Comparative Examples 1 to 4

The respective materials were blended in the proportions shown in Table 1, kneaded in a mortar, poured into a mold, cured at 220° C. for 1 hour, and subjected to various tests. In Comparative Example 1, the components were blended in the proportions shown in Table 1, melted and mixed by heating in a metal container, poured into a mold as it was, transfer-molded at 175° C., and then cured at 160° C. for 2 hours and at 180° C. for 6 hours.

<Dielectric Constant Test and Dielectric Loss Tangent Test>

Using a 10 GHz cavity resonator manufactured by AET Corporation, a test was performed by a cavity resonator perturbation method. In addition, in Example 11 and Comparative Examples 3 and 4, the test was performed again after being allowed to stand in an environment of 85° C. and 85% RH for 2 hours. The results are shown in Table 1.

TABLE 1

| | | Example 11 | Example 12 | Example 13 | Example 14 | Example 15 | Comparative Example 1 | Comparative Example 2 | Comparative Example 3 | Comparative Example 4 |
|---|---|---|---|---|---|---|---|---|---|---|
| Olefin resin | O-1 | 100 | | | | 100 | | | | |
| | O-2 | | 100 | | | | | | | |
| | O-3 | | | 100 | | | | | | |
| | O-4 | | | | 100 | | | | | |
| Epoxy resin | NC-3000-L | | | | | | 100 | | | |
| Phenol curing agent | GPH-65 | | | | | | 74 | | | |
| Imidazole | 2E-4MZ | | | | | | 2.6 | | | |
| Polyphenylene ether resin | SA-9000 | | | | | 100 | | 100 | | |
| Maleimide resin | M-1 | | | | | | | | 100 | |
| | M-2 | | | | | | | | | 100 |
| Thermal radical initiator | DCP | | | | | 2 | | 0.5 | 1 | 1 |
| Evaluation test results | | | | | | | | | | |
| Dielectric constant (initial) | | 2.6 | 2.6 | 2.7 | 2.5 | 2.3 | 3.1 | 2.5 | 2.8 | 2.9 |
| Dielectric loss tangent (initial) | | 0.0014 | 0.0017 | 0.0025 | 0.0020 | 0.0021 | 0.018 | 0.0028 | 0.0033 | 0.0057 |
| Dielectric constant (85° C./85%, 2 hr later) | | 2.5 | — | — | — | — | — | — | 3.1 | 3.7 |
| Dielectric loss tangent (85° C./85%, 2 hr later) | | 0.0014 | — | — | — | — | — | — | 0.021 | 0.060 |

In the table, "—" indicates that measurement has not been performed.

NC-3000-L: Biphenyl aralkyl type epoxy resin (manufactured by Nippon Kayaku Co., Ltd.)

TABLE 1-continued

| | Example 11 | Example 12 | Example 13 | Example 14 | Example 15 | Comparative Example 1 | Comparative Example 2 | Comparative Example 3 | Comparative Example 4 |
|---|---|---|---|---|---|---|---|---|---|

GPH-65: Biphenyl aralkyl type phenol resin (manufactured by Nippon Kayaku Co., Ltd.)
2E4MZ: 2-ethyl-4-methylimidazole (curing accelerator, manufactured by Shikoku Chemicals Corporation)
SA-9000: Polyphenylene ether compound (manufactured by SABIC)
M-1: Biphenyl aralkyl type maleimide resin (obtained by solidifying a resin solution containing the maleimide resin (M2) described in Example 4 of JP-A-2009-001783 by distilling off the solvent thereof under reduced pressure)
M-2: Phenylmethane maleimide
DCP: dicumyl peroxide (radical initiator, manufactured by Tokyo Chemical Industry Co., Ltd)

<Heat Resistance Test>

Regarding Examples 11 to 14 and Comparative Examples 1 and 3, the glass transition temperature (temperature when tan δ is the maximum value) was measured using a dynamic viscoelasticity tester. The results are shown in Table 2.

Dynamic viscoelasticity measuring instrument: DMA-2980 manufactured by TA-Instruments Temperature rising rate: 2° C./min

TABLE 2

| | Example 11 | Example 12 | Example 13 | Example 14 | Comparative Example 1 | Comparative Example 3 |
|---|---|---|---|---|---|---|
| Glass transition temperature (° C.) | 350 or higher | 350 or higher | 350 or higher | 350 or higher | 141 | 205 |

From Table 1, it was confirmed that all of Examples 11 to 15 had excellent dielectric properties. In addition, from Table 2, it was confirmed that all of Examples 11 to 14 had excellent heat resistance. In contrast, it was confirmed that Comparative Example 1 was inferior in both heat resistance and dielectric properties, and Comparative Example 3 had a dielectric loss tangent increased by one order of magnitude after the high-temperature and high-humidity test.

<Heat Resistance Test>

Example 12 and Comparative Example 1 were poured into a mold and cured at 220° C. for 1 hour, and the resultant cured product was subjected to TG/DTA measurement (measurement apparatus: TG/DTA6200, manufactured by Hitachi High-Tech Science Corporation, oxygen gas was blown in at 200 mL/min, temperature rising rate: 10° C./min).

As a result of the heat resistance test, it was confirmed that the 5% weight loss temperature of Example 12 was 438° C., the 5% weight loss temperature of Comparative Example 1 was 347° C., and Example 12 had high resistance to thermal decomposition.

<Compatibility Test>

A compatibility test was conducted between the compound (O-1) obtained in Example 2 and various materials. The case of compatibility was evaluated as "A", the case of turbidity was confirmed as "B", and the case of non-compatibility was evaluated as "C". The blending amounts and the test results are shown in Table 3.

TABLE 3

| | Example 16 | Example 17 | Example 18 | Example 19 | Example 20 | Example 21 | Example 22 |
|---|---|---|---|---|---|---|---|
| O-1 | 60 | 60 | 60 | 60 | 60 | 60 | 60 |
| RICON-100 | 20 | 60 | | | | | |
| RICON-130MA13 | | | 20 | | | | |
| SA-9000 | | | | 20 | 100 | | |
| TUFTEC M1913 | | | | | | 20 | |
| SEPTON2104 | | | | | | | 20 |
| Toluene | 40 | 80 | 40 | 40 | 80 | 160 | 160 |
| Determination | A | A | B | A | A | A | A |

RICON-100: Styrene-butadiene copolymer (manufactured by Cray Valley)
RICON-130MA13: maleic anhydride-modified polybutadiene (manufactured by Cray Valley)
SA-9000: Polyphenylene ether compound (manufactured by SABIC)
TUFTEC M1913: hydrogenated styrene-based thermoplastic elastomer (manufactured by Asahi Kasei Corporation)
SEPTON 2104: hydrogenated styrene-isoprene-styrene copolymer (manufactured by Kuraray Co., Ltd.)

From the results in Table 3, it was confirmed that the compound (O-1) had high compatibility and could be used in combination with a wide range of materials.

<Curability Test and Heat Resistance Evaluation by DSC Measurement>

The compound (O-1) obtained in Example 2 and various materials were blended to form compositions, and each composition was applied to a polyimide film such that the film thickness after drying became 100 μm, dried at 220° C. for 1 hour and cured. The obtained cured product was subjected to a curability test. The case where there was no tack was evaluated as "A", and the case where there was tack was evaluated as "C".

Further, the obtained cured product was subjected to a heat resistance test by DSC measurement. The DSC measurement was performed using DSC6220 (manufactured by SII NanoTechnology Inc.) at a temperature rising rate of 10° C./min within a range of 30° C. to 330° C. while supplying a nitrogen gas at 30 mL/min.

TABLE 4

| | Example 23 | Example 24 | Example 25 | Example 26 |
|---|---|---|---|---|
| O-1 | 100 | 50 | 50 | 50 |
| SA-9000 | | 50 | | |
| RICON-100 | | | 50 | |
| SEPTON 2104 | | | | 50 |
| Toluene | | 152 | 133 | 125 |
| DCP | 1 | 1 | 1 | 1 |
| Curability | A | A | A | A |
| Tg (DSC)/° C. | 330° C. or higher | 253 | 182 | 256 |

From the results in Table 4, it was confirmed that Examples 23 to 26 exhibited good curability and excellent heat resistance.

Example 27

Figure 19:
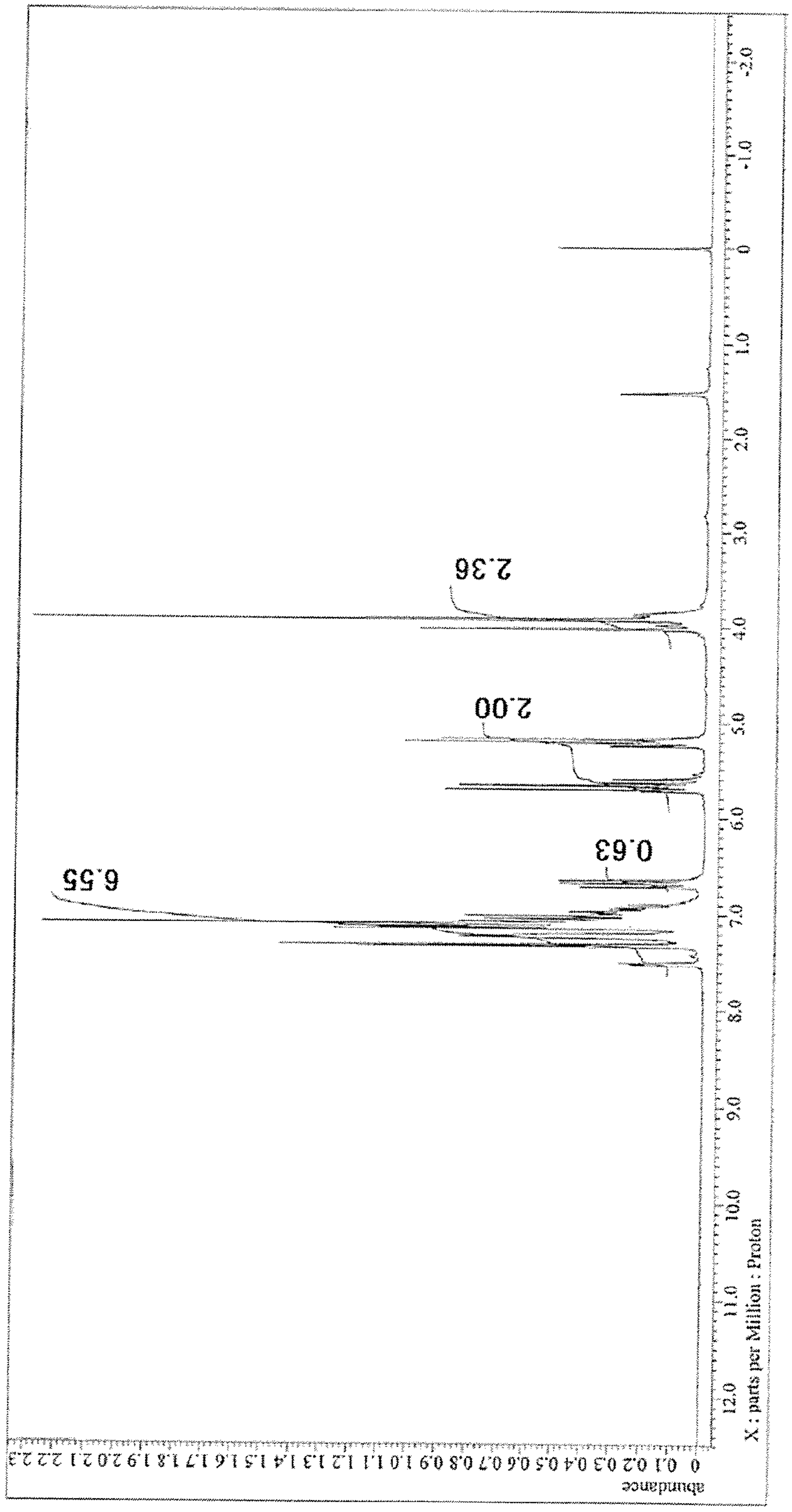
FIG. 19 is a $^1$H-NMR chart of Example 27.

To a flask equipped with a thermometer, a cooling tube, and a stirrer, 22 parts of BEB-1 obtained in Example 1, 25 parts of toluene, 50 parts of dimethyl sulfoxide, 5 parts of water, and 5.4 parts of sodium hydroxide were added, and the mixture was allowed to react at 40° C. for 6 hours. After cooling, 25 parts of toluene was added thereto, and the organic layer was washed once with 100 parts of water. The organic layer was returned to the reaction vessel again, 50 parts of dimethyl sulfoxide and 0.72 parts of a 50 wt % sodium hydroxide aqueous solution were added thereto, and the reaction was performed at 40° C. for 6 hours. After cooling, 75 parts of toluene was added, and the organic layer was washed five times with 100 parts of water. The solvent was distilled off under heating and reduced pressure to obtain 13 parts of a liquid compound (O-7) having a styrene structure as a functional group (Mn: 432, Mw: 575). The $^1$H-NMR data (deuterated chloroform) of the obtained compound is shown in FIG. 19. Vinyl group-derived signals were observed at 5.10 to 5.30 ppm, 5.50 to 5.85 ppm, and 6.60 to 6.80 ppm in the $^1$H-NMR chart.

Example 28

Figure 20:
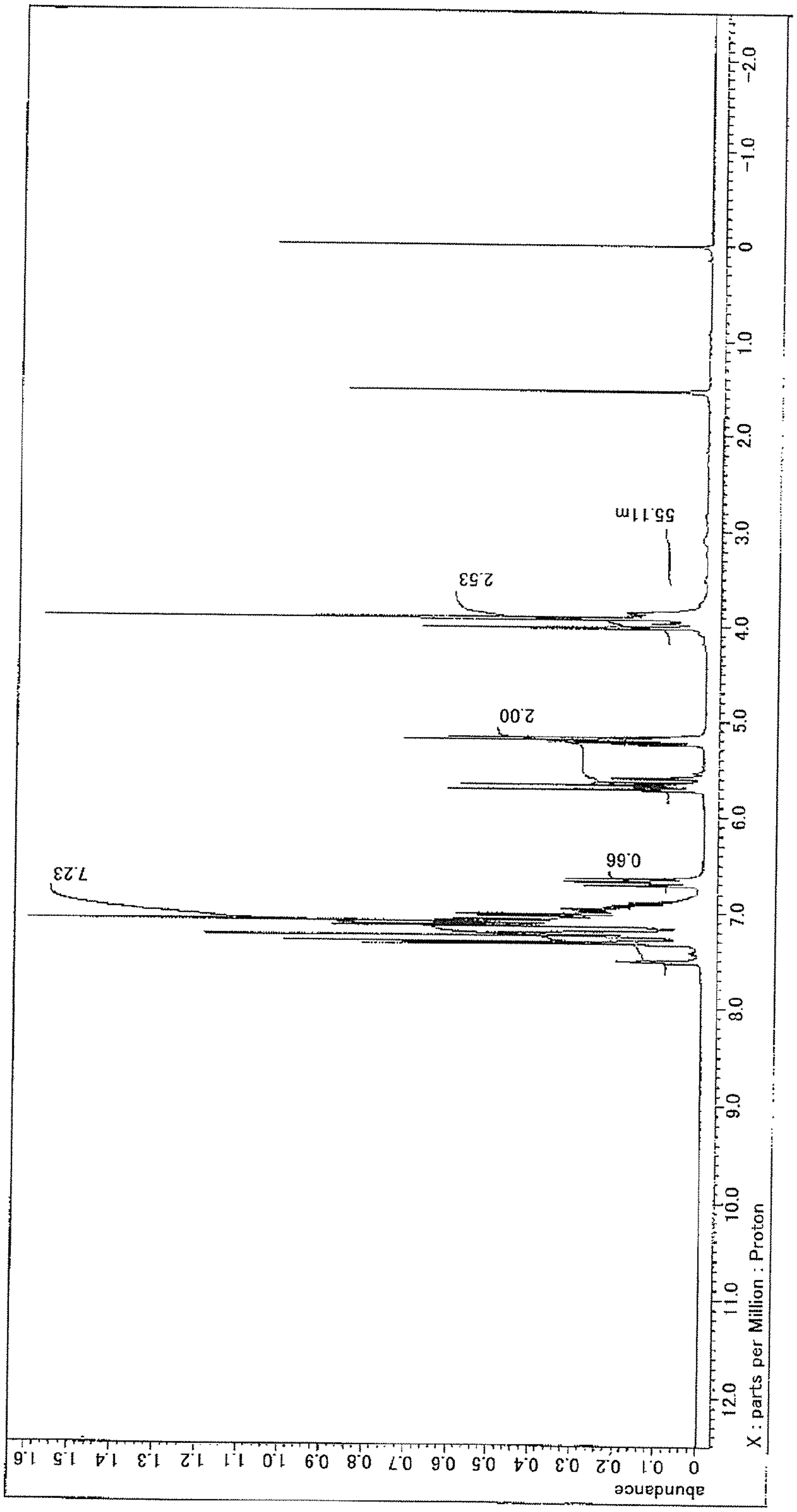
FIG. 20 is a $^1$H-NMR chart of Example 28.

To a flask equipped with a thermometer, a cooling tube, and a stirrer, 22 parts of BEB-1 obtained in Example 1, 15 parts of toluene, 30 parts of dimethyl sulfoxide, 1.5 parts of water, and 5.4 parts of sodium hydroxide were added, and the mixture was allowed to react at 40° C. for 5 hours. After cooling, 100 parts of toluene was added thereto, the organic layer was washed five times with 100 parts of water, and the solvent was distilled off under heating and reduced pressure to obtain 13 parts of a liquid compound (O-8) having a styrene structure as a functional group (Mn: 432, Mw: 575). The $^1$H-NMR data (deuterated chloroform) of the obtained compound is shown in FIG. 20. Vinyl group-derived signals were observed at 5.10 to 5.30 ppm, 5.50 to 5.85 ppm, and 6.60 to 6.80 ppm of the $^1$H-NMR chart, and at the same time, bromoethyl group-derived signals were observed at 2.95 to 3.15 ppm and 3.60 to 3.75 ppm.

<Bromine Content Analysis by Fluorescent X-Ray Analysis>

Apparatus: An automatic sample combustion apparatus (AQF-2100H System: HF-210, GA-210, ACS-240S, manufactured by Mitsubishi Chemical Corporation) and an ion chromatography analyzer (ICS-1600, manufactured by DIONEX Corporation) were used. Procedure: 10 mg of each of the compounds (O-1, O-7, and O-8) was combusted and decomposed by an automatic sample combustion apparatus, and then the generated gas was collected in an absorbing solution (hydrogen peroxide: 90 μg/mL). The amount of bromine was quantified by ion chromatography analysis of the absorbing solution. As a result of the measurement, the bromine contents of O-1, O-7, and O-8 were 300 ppm, 410 ppm, and 9500 ppm, respectively.

<Dielectric Loss Tangent Test>

The compounds O-1, O-7, and O-8 were poured into a mold, cured at 220° C. for 1 hour, and tested by a cavity resonator perturbation method using a 10 GHz cavity resonator manufactured by AET. The dielectric loss tangents of O-1, O-7, and O-8 were 0.0014, 0.0015, and 0.0021, respectively.

As a result of the bromine amount analysis, it was confirmed from the dielectric loss tangent test that the electrical properties deteriorate as the amount of residual bromine increases.

The present application is based on Japanese Patent Application No. 2019-208543 filed on Nov. 19, 2019, Japanese Patent Application No. 2020-8403 filed on Jan. 22, 2020, and Japanese Patent Application No. 2020-82307 filed on May 8, 2020, contents of which are incorporated herein by reference.

INDUSTRIAL APPLICABILITY

The curable resin composition and the cured product thereof of the present invention are useful for applications such as insulating materials for electric and electronic components (highly reliable semiconductor sealing materials and the like), laminated boards (printed wiring boards, BGA substrates, build-up substrates, and the like), adhesives (conductive adhesives and the like), various composite materials such as CFRP, coating materials, and 3D printing.

The invention claimed is:

1. A compound of formula (1):

(1)

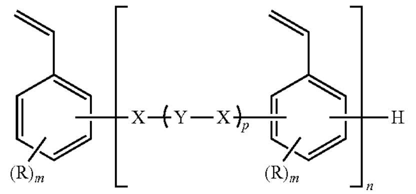

wherein:

X and Y are each a different organic group;

when there is a plurality of X, each X in the plurality of X may be the same as or different from each other;

when there is a plurality of Y, each Y in the plurality of Y may be the same as or different from each other;

R is a hydrocarbon group having 1 to 10 carbon atoms or a halogenated alkyl group;

when there is a plurality of R, each R in the plurality of R may be the same as or different from each other;

m is an integer of 0 to 3;

n is a repeating unit and satisfies $1.1 \leq n \leq 20$; and p is a repeating unit and satisfies $0 \leq p \leq 20$.

2. The compound according to claim 1, wherein in the formula (1):

X is any one or more of (A) to (D):

(A)

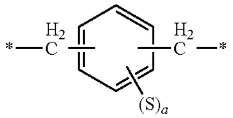

(B)

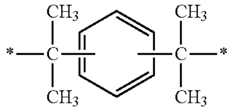

(C)

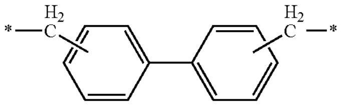

(D)

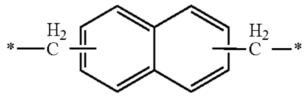

wherein:

S is a hydrocarbon group having 1 to 3 carbon atoms;

a is an integer of 0 to 4;

when there is a plurality of S, each S in the plurality of S may be the same as or different from each other; and the symbol * indicates a bonding position, and Y is any one or more of (E) to (K):

(E)

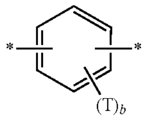

(F)

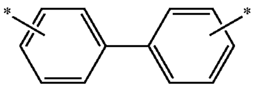

(G)

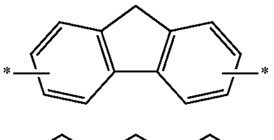

(H)

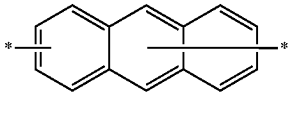

(I)

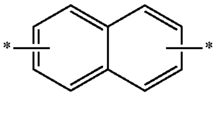

-continued (J)

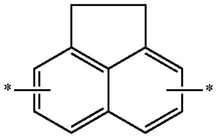

(K)

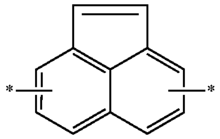

wherein:

T is a hydrocarbon group having 1 to 3 carbon atoms;

b is an integer of 0 to 4;

when there is a plurality of T, each T in the plurality of T may be the same as or different from each other; and the symbol * indicates a bonding position.

3. The compound according to claim 2, wherein in the formula (1), X is (A) or (C), and Y is (E) or (F) described in the formula (3).

4. The compound according to claim 3, wherein in the formula (1), p=0.

5. A mixture comprising the compound according to claim 1 and a polymerization inhibitor.

6. A curable resin composition comprising the compound according to claim 1.

7. The curable resin composition according to claim 6, further comprising one or more compounds selected from the group consisting of a polyphenylene ether compound, a styrene-butadiene copolymer, a butadiene-based thermoplastic elastomer, and a styrene-based thermoplastic elastomer.

8. The curable resin composition according to claim 6, further comprising a radical polymerization initiator.

9. A cured product obtained by curing the compound according to claim 1.

10. A method for producing the compound according to claim 1, comprising subjecting a compound of formula (4) to a dehydrohalogenation reaction in the presence of a basic catalyst:

(4)

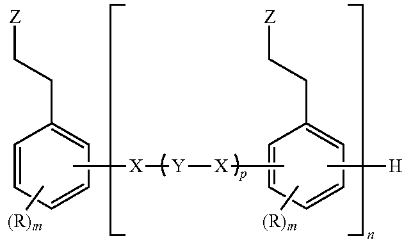

wherein:

X and Y are each a different organic group;

when there is a plurality of X, each X in the plurality of X may be the same as or different from each other;

when there is a plurality of Y, each Y in the plurality of Y may be the same as or different from each other;

Z is a halogen element;

each Z in a plurality of Z may be the same as or different from each other;

R is a hydrocarbon group having 1 to 10 carbon atoms or a halogenated alkyl group;

when there is a plurality of R, each R in the plurality of R may be the same as or different from each other;

m is an integer of 0 to 3;

n is a repeating unit and satisfies $1.1 \leq n \leq 20$; and p is a repeating unit and satisfies $0 \leq p \leq 20$.

* * * * *